United States Patent
Kim et al.

(10) Patent No.: US 8,576,900 B2
(45) Date of Patent: Nov. 5, 2013

(54) METHOD AND APPARATUS FOR TRANSMITTING AND RECEIVING SIGNAL FROM RELAY STATION IN RADIO COMMUNICATION SYSTEM

(75) Inventors: Hak Seong Kim, Anyang-si (KR); Soon Yil Kwon, Anyang-si (KR); Han Byul Seo, Anyang-si (KR); Young Seob Choi, Anyang-si (KR); Byoung Hoon Kim, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 198 days.

(21) Appl. No.: 13/201,805

(22) PCT Filed: Feb. 16, 2010

(86) PCT No.: PCT/KR2010/000950
§ 371 (c)(1),
(2), (4) Date: Aug. 16, 2011

(87) PCT Pub. No.: WO2010/093221
PCT Pub. Date: Aug. 19, 2010

(65) Prior Publication Data
US 2011/0299614 A1 Dec. 8, 2011

Related U.S. Application Data

(60) Provisional application No. 61/152,951, filed on Feb. 16, 2009, provisional application No. 61/187,266, filed on Jun. 15, 2009, provisional application No. 61/219,727, filed on Jun. 23, 2009, provisional application No. 61/236,162, filed on Aug. 24, 2009, provisional application No. 61/298,862, filed on Jan. 27, 2010.

(30) Foreign Application Priority Data

Feb. 16, 2010 (KR) .................. 10-2010-0013907

(51) Int. Cl.
*H04B 1/38* (2006.01)
(52) U.S. Cl.
USPC ........................................ 375/222; 375/260
(58) Field of Classification Search
USPC ........................................ 375/219–222, 260
See application file for complete search history.

(56) References Cited

U.S. PATENT DOCUMENTS

| 6,108,364 A | 8/2000 | Weaver, Jr. et al. |
| 7,952,988 B2 | 5/2011 | Lee et al. |

(Continued)

FOREIGN PATENT DOCUMENTS

| JP | 2007-110754 A | 4/2007 |
| JP | 2007-166620 A | 6/2007 |

(Continued)

*Primary Examiner* — Emmanuel Bayard
(74) *Attorney, Agent, or Firm* — Birch, Stewart, Kolasch & Birch, LLP

(57) ABSTRACT

A method for a transmitting and receiving a signal from a relay station in a radio communication system is provided. The method comprises the steps of: receiving offset time information from a base station; configuring a time difference between an access downlink transmission subframe that transmits an access downlink signal to a relay station terminal according to the offset time information and a backhaul downlink reception subframe that receives a backhaul downlink signal from the base station; transmitting a control signal from the access downlink transmission subframe to the relay station terminal; and receiving the backhaul downlink signal from the base station in the backhaul downlink reception subframe.

12 Claims, 39 Drawing Sheets

(56) References Cited

U.S. PATENT DOCUMENTS

| | | | |
|---|---|---|---|
| 8,032,183 B2* | 10/2011 | Rudrapatna | 455/562.1 |
| 2008/0043647 A1 | 2/2008 | Yoshida et al. | |
| 2008/0212516 A1 | 9/2008 | Son et al. | |
| 2009/0122731 A1* | 5/2009 | Montojo et al. | 370/280 |
| 2009/0279458 A1* | 11/2009 | Shen et al. | 370/280 |

FOREIGN PATENT DOCUMENTS

| | | |
|---|---|---|
| JP | 2008-48218 A | 2/2008 |
| KR | 10-2008-0016496 A | 2/2008 |
| KR | 10-2008-0080724 A | 9/2008 |
| KR | 10-2008-0093257 A | 10/2008 |
| WO | WO 2007/100232 A1 | 9/2007 |

* cited by examiner

METHOD AND APPARATUS FOR TRANSMITTING AND RECEIVING SIGNAL FROM RELAY STATION IN RADIO COMMUNICATION SYSTEM

CROSS REFERENCE TO RELATED APPLICATIONS

This application is the National Phase of PCT/KR2010/000950 filed on Feb. 16, 2010, which claims priority under 35 U.S.C. 119(e) to U.S. Provisional Application Nos. 61/152,951 filed on Feb. 16, 2009, 61/187,266 filed on Jun. 15, 2009, 61/219,727 filed on Jun. 23, 2009, 61/236,162 filed on Aug. 24, 2009 and 61/298,862 filed on Jan. 27, 2010 and under 35 U.S.C. 119(a) to Patent Application No. 10-2010-0013907 filed in Republic of Korea on Feb. 16, 2010, all of which are hereby expressly incorporated by reference into the present application.

TECHNICAL FIELD

The present invention relates to wireless communication, and more particularly, to a method of transmitting a signal in a wireless communication system including a relay station.

BACKGROUND ART

In ITU-R (International Telecommunication Union Radio communication sector), a standardization task for IMT (International Mobile Telecommunication)-Advanced (i.e., the next-generation mobile communication system after the 3$^{rd}$ generation) is being in progress. IMT-Advanced sets its goal to support IP (Internet Protocol)-based multimedia service at the data transfer rate of 1 Gbps in the stop and slow-speed moving states and at the data transfer rate of 100 Mbps in the fast-speed moving state.

3GPP (3$^{rd}$ Generation Partnership Project) is a system standard to satisfy the requirements of IMT-Advanced, and it is preparing for LTE-Advanced improved from LTE (Long Term Evolution) based on OFDMA (Orthogonal Frequency Division Multiple Access)/SC-FDMA (Single Carrier-Frequency Division Multiple Access) transmission schemes. LTE-Advanced is one of the strong candidates for IMT-Advanced. Relay station technology is included in the major technology of LTE-Advanced.

A relay station is an apparatus for relaying signals between a base station and a user equipment and is used to extend the cell coverage of a wireless communication system and improve the throughput.

In a wireless communication system including a relay station, a lot of researches are being carried out on a method of transmitting a signal between a base station and the relay station. To use a conventional method of transmitting a signal between a base station and a mobile station in transmitting a signal between a base station and a relay station without change is problematic.

In the conventional method of transmitting a signal between a base station and a mobile station, in general, the mobile station transmits a signal over the one entire subframe when viewed from the time domain. One of the reasons why the mobile station transmits a signal over the one entire subframe is to set the duration time of each channel through which the signal is transmitted as long as possible in order to reduce the maximum instant power consumed by the mobile station.

However, a relay station may not frequently transmit or receive a signal over the entire one subframe when viewed from the time domain. A relay station experiences the frequent switching of a reception mode and a transmission mode because it relays signals for a plurality of mobile stations. There is a need for a specific time period (hereinafter called a guard time) for which the relay station does not transmit or receive a signal in order to prevent interference between signals and stabilize the operation between the reception mode period and the transmission mode period when the reception mode and the transmission mode are switched.

Unlike a mobile station, a relay station may not transmit or receive a signal over the one entire subframe owing to the guard time. Accordingly, the conventional method of transmitting a signal between a base station and a mobile station cannot be used without change.

Furthermore, since a relay station has fewer power restrictions as compared with a mobile station and typically has an excellent channel state with a base station, the conventional method of transmitting a signal between a base station and a mobile station needs not to be used to transmit a signal between a base station and a relay station without change.

There is a need for a new method of transmitting a signal in a wireless communication system including a relay station.

DISCLOSURE

Technical Problem

An object of the present invention is to provide a method of transmitting a signal in a wireless communication system including a relay station.

Technical Solution

A method of a relay station transmitting and receiving a signal in a wireless communication system, including the steps of receiving offset time information from a base station; configuring a time difference between an access downlink transmission subframe through which an access downlink signal is transmitted to a relay user equipment and a backhaul downlink reception subframe through which a backhaul downlink signal is received from the base station based on the offset time information; transmitting a control signal to the relay user equipment through a backhaul downlink transmission subframe; and receiving the backhaul downlink signal from the base station through the backhaul downlink reception subframe.

Advantageous Effects

A signal can be efficiently transmitted in a wireless communication system including a relay station.

MODE FOR INVENTION

3GPP ($3^{rd}$ Generation Partnership Project) LTE (Long Term Evolution) is part of an E-UMTS (Evolved-Universal Mobile Telecommunications System), and it adopts OFDMA (Orthogonal Frequency Division Multiple Access) in downlink and adopts SC-FDMA (Single Carrier-Frequency Division Multiple Access) in uplink. LTE-A (LTE-Advanced) is the evolution of LTE. 3GPP LTE/LTE-A is chiefly described below, but the technical feature of the present invention is not limited thereto.

Figure 1:
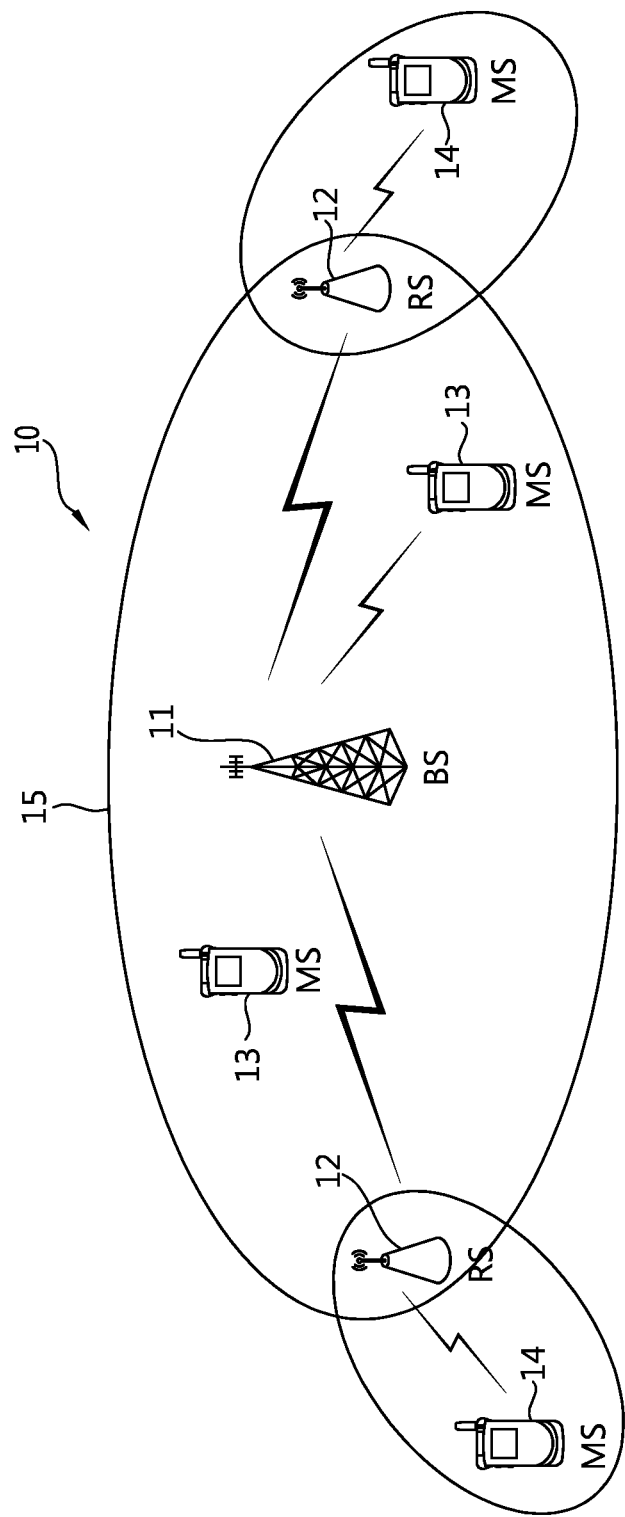
FIG. 1 shows a wireless communication system including an RS.

FIG. 1 shows a wireless communication system including a relay station.

Referring to FIG. 1, the wireless communication system 10 including a relay station includes at least one Base Station (BS) 11. The BS 11 provides communication service to a specific geographical area 15 commonly called a cell. The cell may be divided into a plurality of areas. Each of the areas is called a sector. The one or more cells may exist in one BS. In general, the BS refers to a fixed station communicating with a User Equipment (UE) 13. The BS 11 may also be called another terminology, such as an eNB (evolved NodeB), a BTS (Base Transceiver System), an access point, or an AN (Access Network). The BS 11 may perform functions, such as connectivity between UEs 14, management, control, and resource allocation.

A Relay Station (RS) 12 refers to equipment for relaying a signal between the BS 11 and the UE 14, and it may also be called another terminology, such as a Relay Node (RN), a repeater, or a relay. Any method, such as AF (amplify and forward) and DF (decode and forward), may be used as a relay method used in the RS, and the technical feature of the present invention is not limited thereto.

The UE 13 or 14 may be fixed or mobile and may also be called another terminology, such as an MS (Mobile Station), an UT (User Terminal), an SS (Subscriber Station), a wireless device, a PDA (Personal Digital Assistant), a wireless modem, a handheld device, or an AT (Access Terminal. Hereinafter, a Macro UE (Ma UE) 13 refers to a UE directly communicating with the BS 11, and a relay UE (Re UE) 14 refers to a UE communicating with an RS. The Ma UE 13 placed within the cell of the BS 11 may also communicate with the BS 11 via the RS 12 in order to improve the transfer rate according to a diversity effect.

Hereinafter, a link between the BS 11 and the Ma UE 13 is said to be a macro link. The macro link may be divided into a macro downlink (M-DL) and a macro uplink (M-UL). The M-DL means communication from the BS 11 to the Ma UE 13, and the M-UL means communication from the Ma UE 13 to the BS 11.

A link between the BS 11 and the RS 12 is said to be a backhaul link. The backhaul link may be divided into a backhaul downlink (B-DL) and a backhaul uplink (B-UL). The B-DL means communication from the BS 11 to the RS 12, and the B-UL means communication from the RS 12 to the BS 11.

A link between the RS 12 and the Re UE 14 is said to be an access link. The access link may be divided into an access downlink (A-DL) and an access uplink (A-UL). The A-DL means communication from the RS 12 to the Re UE 14, and the A-UL means communication from the Re UE 14 to the RS 12.

The wireless communication system 10 including an RS is a system supporting bi-directional communication. The bi-directional communication may be performed using a TDD (Time Division Duplex) mode, an FDD (Frequency Division Duplex) mode and the like. The TDD mode use different time resources in UL transmission and DL transmission. The FDD mode uses different frequency resources in UL transmission and DL transmission.

Figure 2:
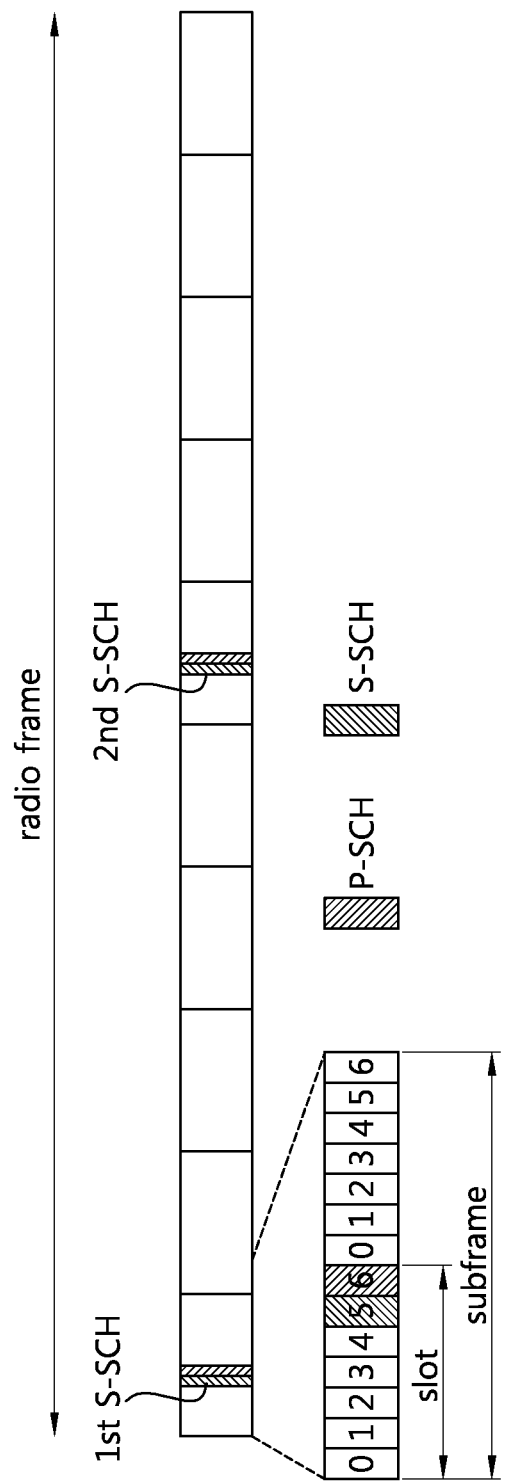
FIG. 2 shows the structure of a radio frame in 3GPP LTE.

FIG. 2 shows the structure of a radio frame in 3GPP LTE.

Referring to FIG. 2, the radio frame includes 10 subframes. One subframe consists of two slots. The time taken to transmit one subframe is called a TTI (Transmission Time Interval). For example, the length of one subframe may be 1 millisecond (ms) and the length of one slot may be 0.5 ms.

For the structure of the radio frame described with reference to FIG. 2, reference can be made to Section 4.1 and Section 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)".

Figure 3:
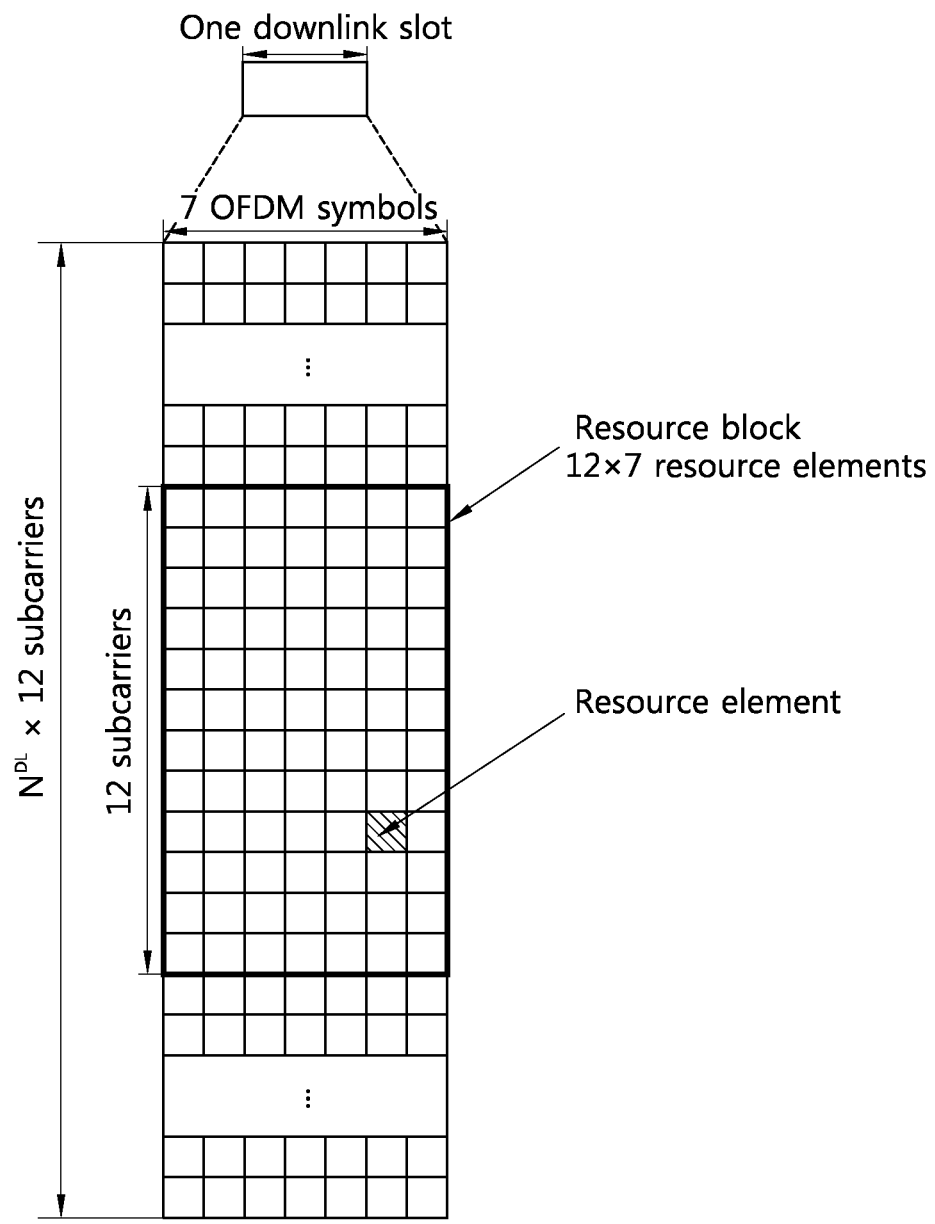
FIG. 3 is an exemplary diagram showing a resource grid for one downlink slot.

FIG. 3 is an exemplary diagram showing a resource grid for one downlink slot.

In FDD and TDD radio frames, one slot includes a plurality of OFDM (orthogonal frequency division multiplexing) symbols in the time domain and includes a plurality of resource blocks (RB) in the frequency domain. The OFDM symbol is for representing one symbol period (or symbol time) because 3GPP LTE uses OFDMA in downlink. The OFDM symbol may also be called an SC-FDMA symbol according to multiple access scheme. The symbol period may hereinafter refer to one OFDM symbol or one SC-FDMA symbol. The resource block is a resource allocation unit, and it includes plurality of consecutive subcarriers in one slot.

Referring to FIG. 3, a slot (e.g., a downlink slot included in a downlink subframe) includes a plurality of OFDM symbols in the time domain. Here, the one downlink slot is illustrated to include 7 OFDM symbols and one resource block is illustrated include 12 subcarriers in the frequency domain, but not limited thereto.

Each element on the resource grid is called a resource element. One resource block includes 12×7 resource elements. The number of resource blocks $N^{DL}$ included in the downlink slot is dependent on a DL transmission bandwidth configuration in a cell.

Figure 4:
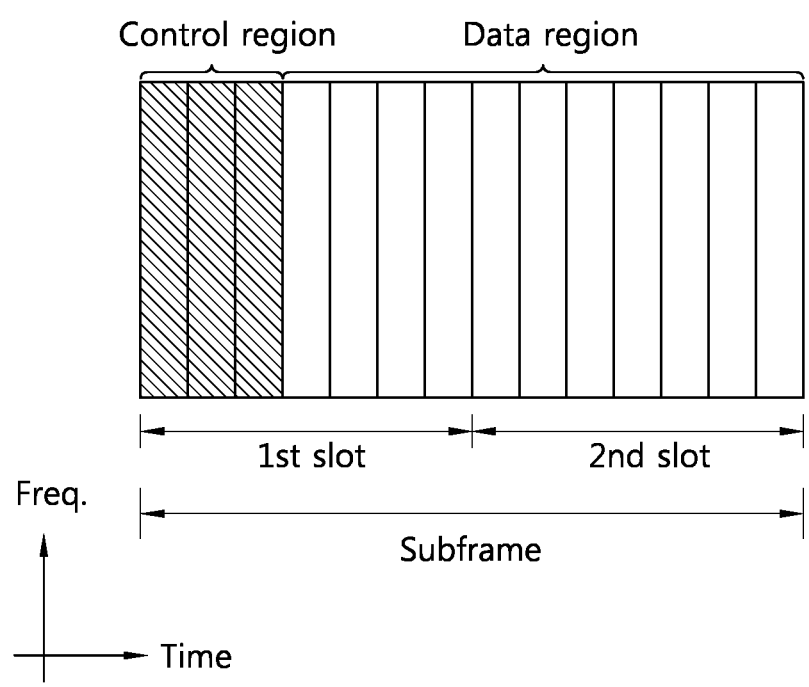
FIG. 4 shows the structure of a downlink subframe.

FIG. 4 shows the structure of a downlink subframe.

Referring to FIG. 4, the subframe includes 2 consecutive slots. The first 3 OFDM symbols in the first slot of the subframe correspond to a control region to which PDCCH (physical downlink control channel)s are allocated, and the remaining OFDM symbols correspond to a data region to which PDSCH (physical downlink shared channel)s are allocated. Control channels, such as PCFICH (physical control format indicator channel) and PHICH (physical hybrid automatic repeat request indicator channel), may be allocated to the control region in addition to the PDCCHs. A UE can read data information transmitted through the PDSCH by decoding control information transmitted through the PDCCH. The control region is illustrated to include the 3 OFDM symbols, but is only exemplary. 2 OFDM symbol or 1 OFDM symbol may be included in the control region. The number of OFDM symbols included in the control region within the subframe can be known through the PCFICH.

The control region is formed of a logical CCE column including a plurality of CCEs (control channel elements). The CCE column is a set of all CCEs which form the control region within one subframe. The CCE corresponds to a plurality of resource element groups. For example, The CCE may correspond to 9 resource element groups. The resource element group is used to define that the control channel is mapped to the resource element. One resource element group may consist of 4 resource elements.

A plurality of PDCCHs may be transmitted within the control region. The PDCCH carries control information, such as scheduling allocation. The PDCCH is transmitted over one CCE or an aggregation of several consecutive CCEs. The format of the PDCCH and the number of possible bits of the PDCCH are determined according to the number of CCEs forming the CCE aggregation. The number of CCEs used for PDCCH transmission is called a CCE aggregation level. Furthermore, the CCE aggregation level is a CCE unit for searching for a PDCCH. The size of the CCE aggregation level is defined by the number of contiguous CCEs. For example, the CCE aggregation level may be an element of {1, 2, 4, 8}.

The control information transmitting through the PDCCH is called Downlink Control Information (hereinafter DCI). The DCI includes UL scheduling information, DL scheduling information, system information, UL power control command, control information for paging, control information for a random access response (RACH response) and the like.

The DCI format includes a format 0 for PUSCH (Physical Uplink Shared Channel) scheduling, a format 1 for the scheduling of one PDSCH codeword, a format 1A for the compact scheduling of one PDSCH codeword, a format 1B for compact scheduling for the rank-1 transmission of a single codeword in a spatial multiplexing mode, a format 1C for the very compact scheduling of a DL-SCH (Downlink Shared Channel), a format 1D for PDSCH scheduling in a multiple user spatial multiplexing mode, a format 2 for PDSCH scheduling in a closed-loop spatial multiplexing mode, a format 2A for PDSCH scheduling in an open-loop spatial multiplexing mode, a format 3 for the transmission of the TPC (Transmission Power Control) command of 2-bit power control for a PUCCH (physical uplink control channel) and a PUSCH, a format 3A for the transmission of the TPC command of 1-bit power control for a PUCCH and a PUSCH and the like.

Figure 5:
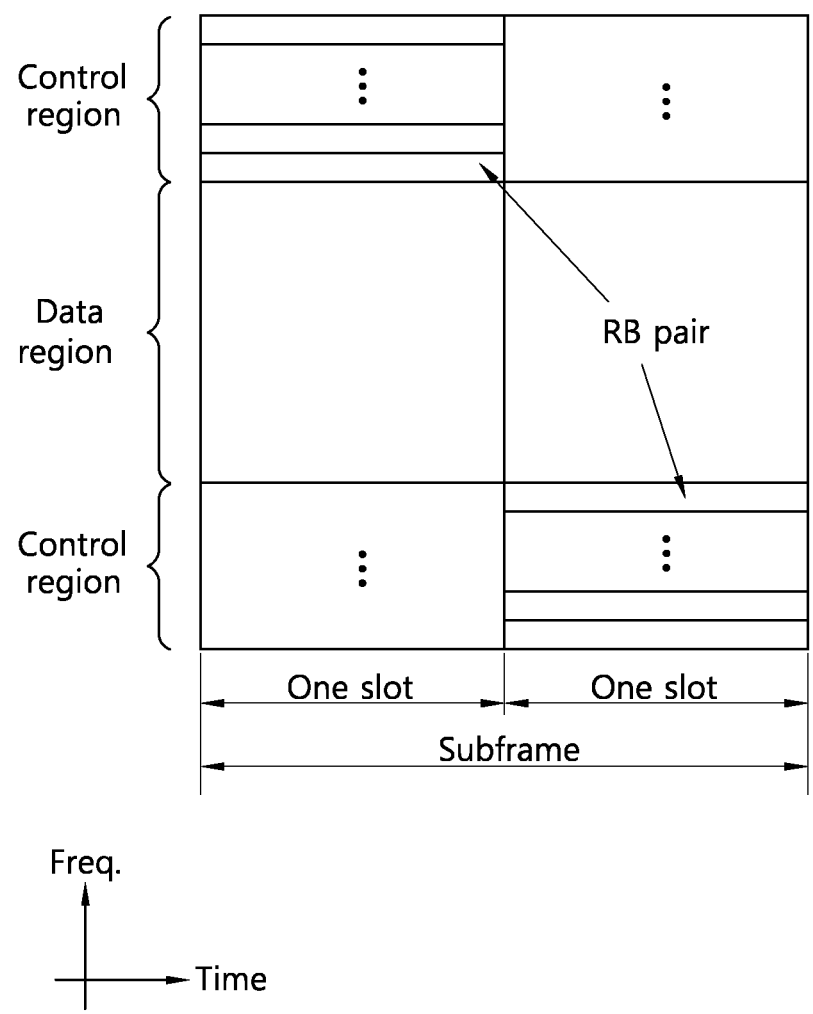
FIG. 5 shows the structure of an uplink subframe.

FIG. 5 shows the structure of an uplink subframe.

Referring to FIG. 5, the uplink subframe may be divided into a control region to which a PUCCH for carrying UL control information is allocated and a data region to which a PUSCH for carrying user data is allocated in the frequency domain.

A pair of resource blocks (RB) 51 and 52 is allocated to the PUCCH for one UE in the subframe. The pair of RBs 51 and 52 occupy different subcarriers in two slots, respectively. This is said that the RB pair allocated to the PUCCH is subjected to frequency hopping at a slot boundary.

The PUCCH can support multiple formats. That is, the PUCCH can transmit UL control information having a different number of bits per subframe according to a modulation scheme. For example, when BPSK (Binary Phase Shift Keying) is used (PUCCH format 1a), the UL control information of 1 bit can be transmitted through the PUCCH. When QPSK (Quadrature Phase Shift Keying) is used (PUCCH format 1b), the UL control information of 2 bits can be transmitted through the PUCCH. The PUCCH format may include a format 1, a format 2, a format 2a, a format 2b and the like (For this, reference can be made to Section 5.4 of 3GPP TS 36.211 V8.2.0 (2008-03) "Technical Specification Group Radio Access Network; Evolved Universal Terrestrial Radio Access (E-UTRA); Physical Channels and Modulation (Release 8)").

Figure 6:
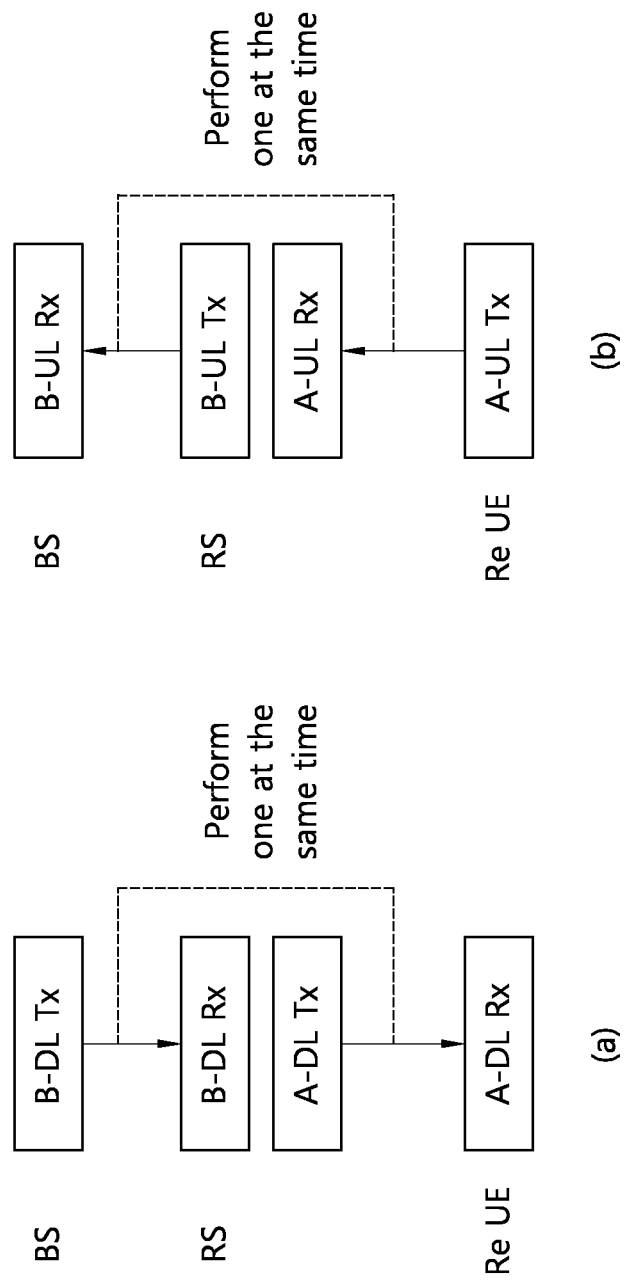
FIG. 6 shows an operation which may be performed by an RS and restriction conditions therefor.

FIG. 6 shows an operation which may be performed by an RS and restriction conditions therefor.

The RS can perform backhaul uplink transmission (B-UL Tx) and backhaul downlink reception (B-DL Rx) in a relationship with a BS. The BS can perform backhaul downlink transmission (B-DL Tx) and backhaul uplink reception (B-UL Rx) in a relationship with the RS.

The RS can perform access downlink transmission (A-DL Tx) and access uplink reception (A-UL Rx) in a relationship with an Re UE. The Re UE can perform access uplink transmission (A-UL Tx) and access downlink reception (A-DL Rx) in a relationship with the RS.

Although not shown in FIG. 6, the BS can perform macro downlink transmission (M-DL Tx) and macro uplink reception (M-UL Rx) in a relationship with an Ma UE.

In general, an RS cannot transmit and receive signals at the same time in the same frequency band owing to self-interference. That is, the RS cannot perform B-DL Rx and A-DL Tx at the same time. Furthermore, the RS cannot perform B-UL Tx and A-UL Rx at the same time. Accordingly, the transmission and reception of signals in the same frequency band are performed over different subframes.

In general, when B-DL Rx and A-DL Tx are switched, the RS requires a guard time (or guard period). Likewise, when B-UL Tx and A-UL Rx are switched, the RS requires a guard time. The guard time may be about 20 microsecond (μs) by taking the transient time characteristic of an analog amplifier, used in the RS, into consideration.

Figure 7:
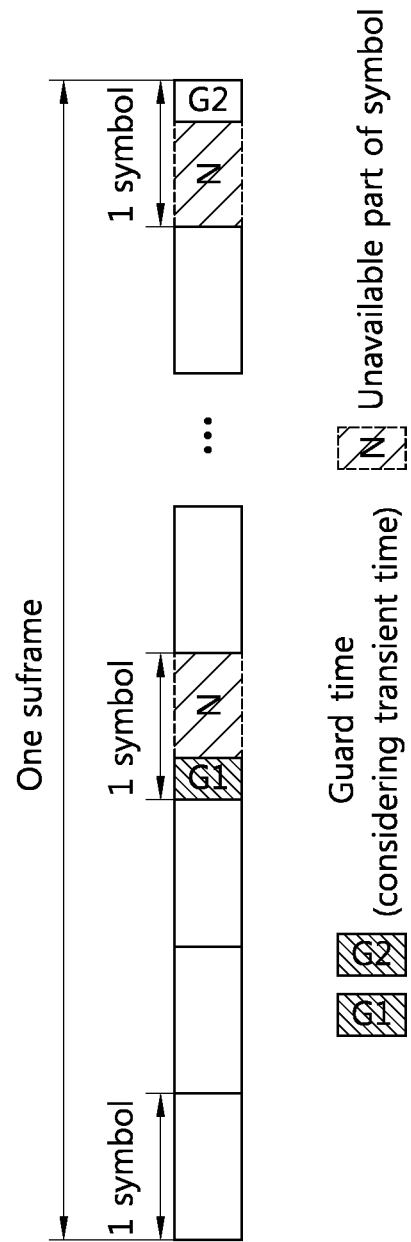
FIGS. 7 and 8 show examples in which a guard time is disposed within a subframe.
Figure 8:
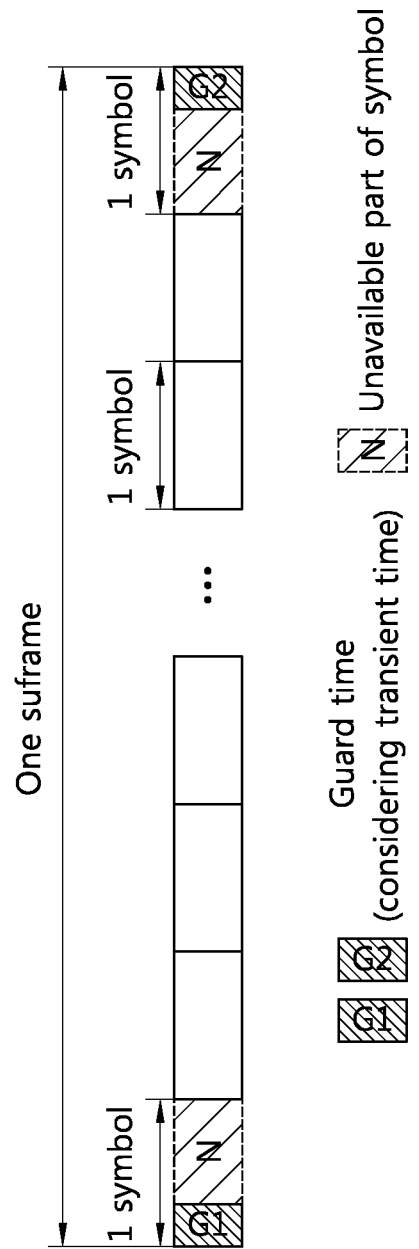

FIGS. 7 and 8 show examples in which a guard time is disposed within a subframe.

The guard time may be time duration smaller than one symbol (e.g., one OFDM symbol or one SC-FDMA symbol). That is, in the temporal aspect, the guard time may be part of one symbol. The position of the guard time and the size of the guard time may be changed in various ways according to the structure of a backhaul subframe and a timing relationship between access subframes. For example, one of the guard times may be placed at the central symbol of a subframe as shown in FIG. 7, or the guard times may be placed at the first and the last symbols of a subframe as shown in FIG. 8. In 3GPP LTE, a minimum scheduling unit is a subframe. Accordingly, if transmission/reception switching is performed in a backhaul link and an access link, an RS performs the switching by the unit of subframe. In this case, the guard times are placed at the first symbol and the last symbol of a subframe as shown in FIG. 8. If the guard time is placed within one symbol, although the guard time occupies a time period smaller than one symbol, the related symbol may not be used (parts of symbols that cannot be used in FIGS. 7 and 8 are indicated by 'N'). That is, the symbol including the guard time is wasted.

Furthermore, in 3GPP LTE, an SRS (sounding reference signal) for UL scheduling is transmitted over the last symbol of a subframe. If the last symbol of a subframe cannot be used owing to the guard time as described above, an RS is difficult to transmit the SRS.

One of methods for solving the problem is a method of defining a new symbol. In other words, a symbol, having a time period smaller than that of a conventional symbol (e.g., an OFDM symbol or an SC-FDMA symbol), is defined. The waste of radio resources can be prevented by applying the new symbol to the time duration which is wasted owing to a guard time.

Another method for solving the above problem is to shift a signal transmission/reception subframe between a BS, an RS, and a UE based on offset time information or additional alignment information or both.

Terms are first defined, for clarity of description.

Figure 9:
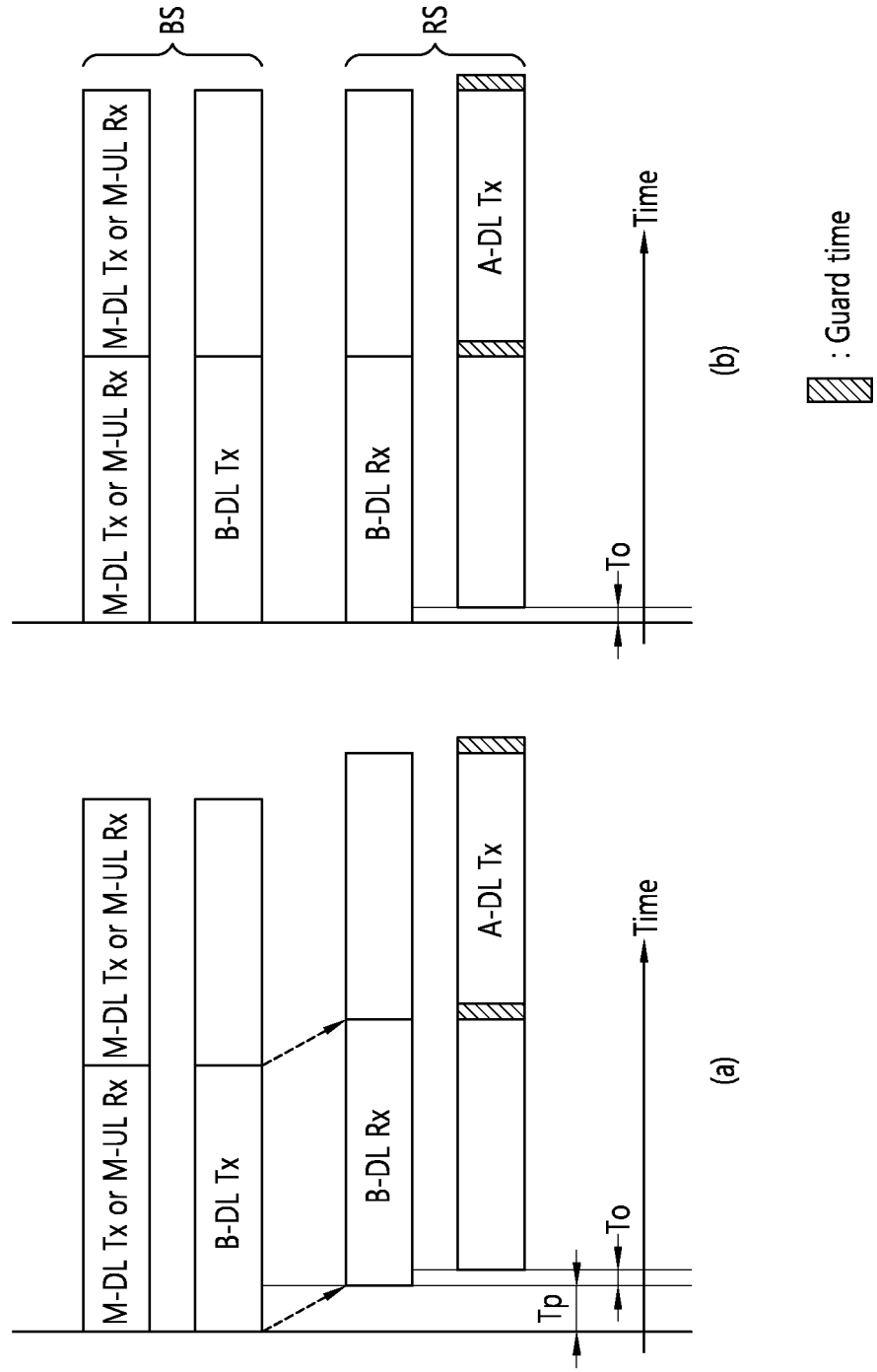
FIG. 9 shows a propagation delay time and an offset time.

FIG. 9 shows a propagation delay time and an offset time.

Referring to FIG. 9 (*a*), a BS performs B-DL Tx. In this case, an RS performs B-DL Rx after a propagation delay time Tp. That is, the propagation delay time is the delay time occurring owing to the transmission of a physical signal, in the time taken for a source station to transmit a signal and the time taken for a destination station to receive the signal. An offset time To means an intentional offset between the backhaul link subframe and the access link subframe of the RS. In FIG. 9(*a*), the RS may perform B-DL Rx and A-DL Tx with the offset time To. The information for propagation delay time or the offset time or both can be transmitted from a BS to an RS and a UE. The BS may transmit information for the offset time through the synchronization signal of a P-BCH or a physical channel (e.g., a PDCCH). When the information for offset time is received from the BS, the RS or the UE transmits or receive a signal in response to relevant timing.

FIG. 9(*b*) is a diagram except the propagation delay time of FIG. 9(*a*). If the propagation delay time is excluded, FIG. 9(*a*) can be simply shown as in FIG. 9(*b*). In the following description and figures, the propagation delay time is excluded, if necessary, and a timing relationship for signal transmission/reception between a BS, an RS, and a UE is shown.

FIGS. 10 to 14 are diagrams showing timing relationships between a subframe over which an RN receives a backhaul DL signal from an eNB and a subframe over which the RN transmits an access DL signal to an Re UE on the basis of a macro subframe. Here, the propagation delay time is taken into account.

Figure 10:
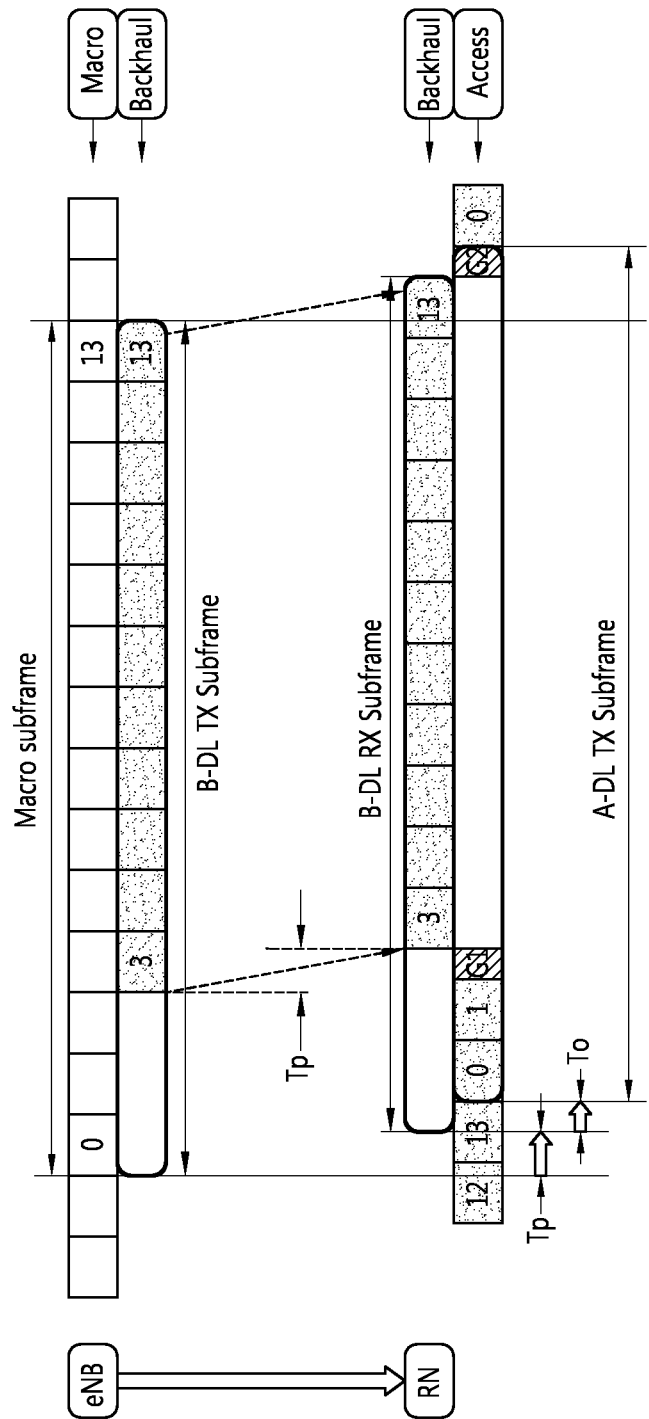
FIG. 10 shows an example of a timing relationship between the macro subframe of a BS and the B-DL Rx subframe and the A-DL Tx subframe of an RS.

FIG. 10 shows an example of a timing relationship between the macro subframe of an eNB and the B-DL Rx subframe and the A-DL Tx subframe of an RN.

Referring to FIG. 10, the macro subframe and the B-DL Tx subframe are aligned. The B-DL Rx subframe is temporally placed behind the B-DL Tx subframe by a propagation delay time Tp by taking the propagation delay time Tp into account. The A-DL Tx subframe is shifted by a fixed offset time To and placed in the B-DL Rx subframe. It corresponds to a case where a switching time in the RN is longer than a cyclic prefix.

In this timing relationship, it is assumed that the RN transmits a control signal to the Re UE using K symbols. For example, it is assumed that the number of symbols used in an R-PDCCH through which the RN transmits the control signal to the Re UE is K (the same hereinafter). In this case, the RN can receive a backhaul DL signal over symbols having a symbol index M=K+1 to the last symbol index of the subframe. For example, assuming that the number of symbols used in the R-PDCCH transmitted by the RN is 2, the RN can receive the backhaul DL signal using symbols from a symbol index 3 to a symbol index 13 (i.e., the last symbol of the subframe). There is an advantage in that available radio resources in a backhaul link are increased because the RN can use the symbol having the symbol index 3 and the symbol having the symbol index 13.

Figure 11:
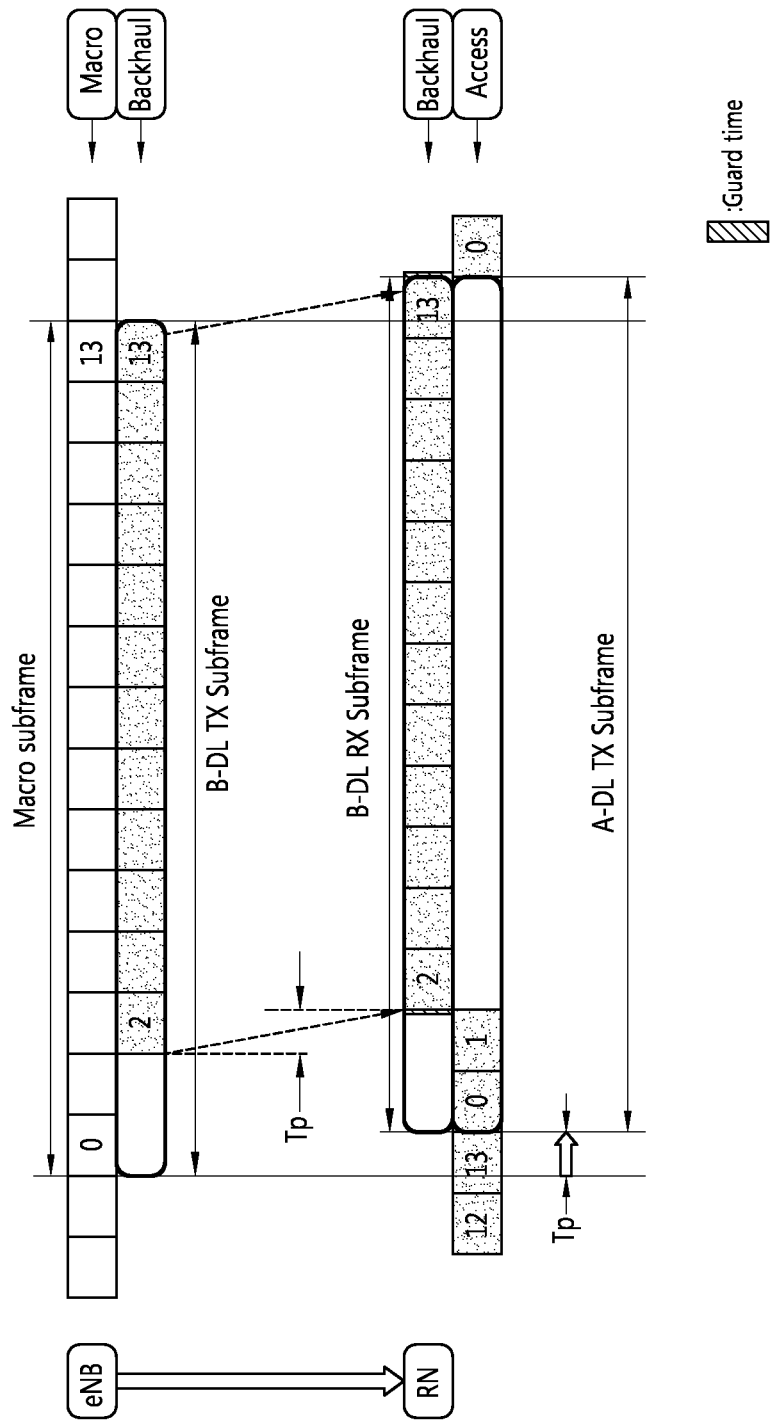
FIG. 11 shows another example of a timing relationship between the macro subframe and the B-DL Tx subframe of a BS and the B-DL Rx subframe and the A-DL Tx subframe of an RS.

FIG. 11 shows another example of a timing relationship between the macro subframe and the B-DL Tx subframe of an eNB and the B-DL Rx subframe and the A-DL Tx subframe of an RN.

This timing relationship corresponds to a case where the switching time of the RN is very short (e.g., shorter than a cyclic prefix) and a case where the B-DL Rx subframe and the A-DL Tx subframe are aligned. The switching time may be very short according to the performance of an analog amplifier used in the RN. Here, the guard time is placed ahead of a symbol having a symbol index 2 in the B-DL Rx subframe and placed behind a symbol having a symbol index 13. Since the time period of the guard time is shorter than the cyclic prefix, it may be said that synchronization between symbols is not influenced.

In this timing relationship, the RN can receive a backhaul DL signal using symbols from a symbol index M=K to the last symbol index of the subframe. That is, this timing relationship differs from that of FIG. 10 in that the symbol index at which the backhaul DL signal can be received is started from K.

Figure 12:
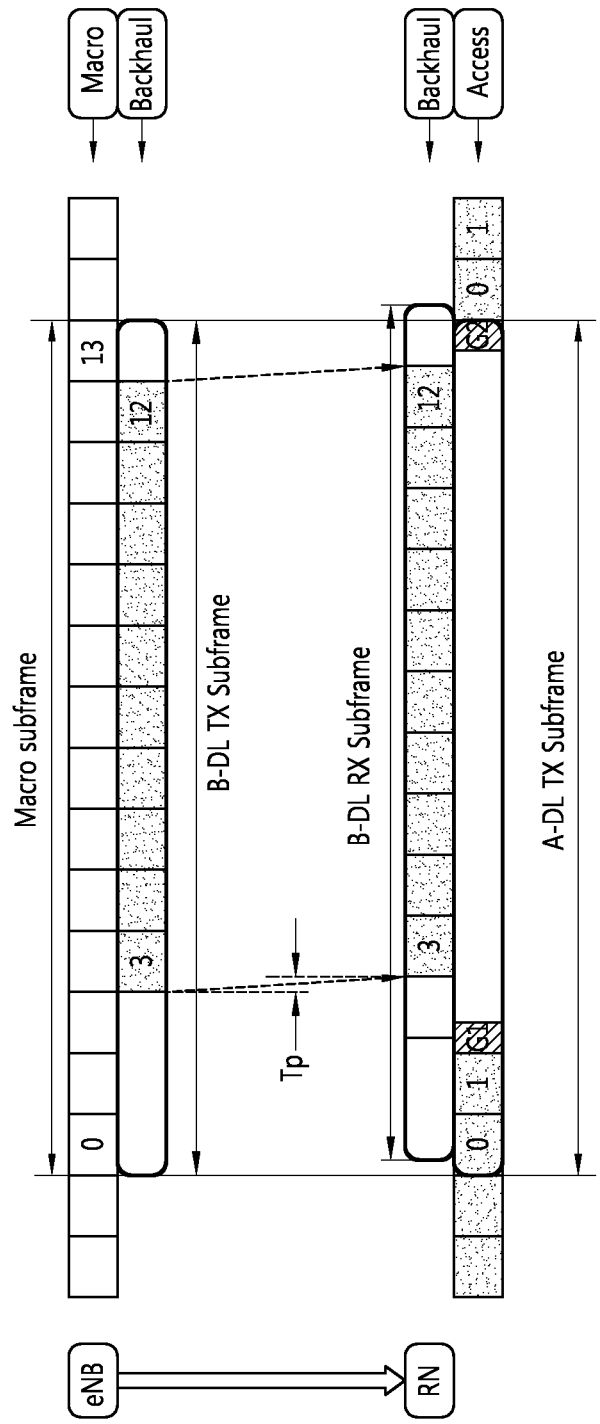
FIGS. 12 to 14 show yet another example of a timing relationship between the macro subframe and the B-DL Tx subframe of a BS and the B-DL Rx subframe and the A-DL Tx subframe of an RS.
Figure 13:
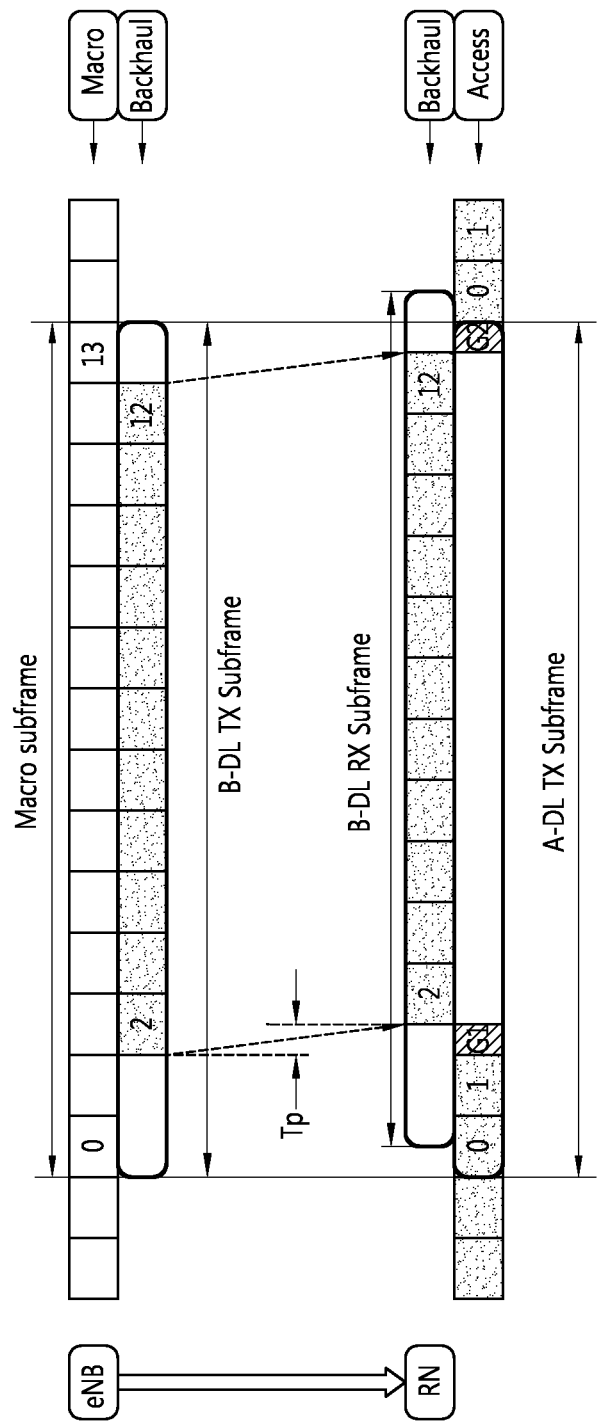
Figure 14:
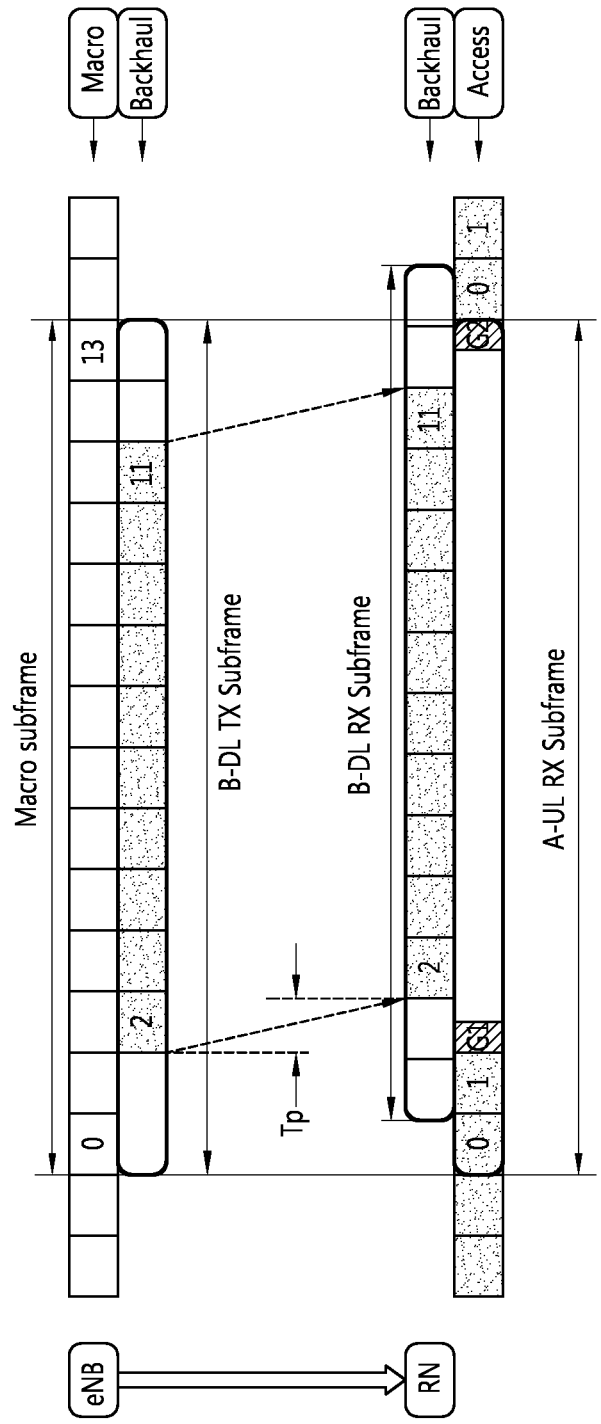

FIGS. 12 to 14 show yet another example of a timing relationship between the macro subframe and the B-DL Tx subframe of an eNB and the B-DL Rx subframe and the A-DL Tx subframe of an RN.

Referring to FIG. 12, the B-DL Tx subframe of the eNB and the A-DL Tx subframe of the RN are started on the same time (i.e., synchronized). The B-DL Rx subframe may be shifted from the B-DL Tx subframe by a propagation delay time Tp. This timing relationship corresponds to a case where the propagation delay time Tp is shorter than one symbol period L, the propagation delay time Tp is shorter than a guard time G1, and a (Tp+guard time G2) is shorter than a symbol period L. This may be represented by [(Tp<L) & (Tp<G1) & (Tp+G2<L), the symbol period=L].

The RN can receive a backhaul DL signal from a symbol having a symbol index M (K or higher than K) to a symbol having a symbol index of n. The symbol index n may be varied according to the propagation delay time Tp and the size of a guard time according to a switching time. For example, when K=2, in FIG. 12, the RN can receive the backhaul DL signal using symbols having symbol indices M=3 to 12.

FIG. 13 shows an example in which a guard time G1 is shorter than a propagation delay time Tp, the propagation delay time Tp is shorter than a symbol period L, and the sum of the propagation delay time Tp and a guard time G2 is shorter than the symbol period L. That is, [(G1<Tp<L) & (Tp+G2<L), the symbol period=L]. In this case, the RN can receive a backhaul DL signal using symbols having symbol indices M=2 to 12. That is, the RN can use the 11 symbols for backhaul downlink reception (B-DL Rx).

FIG. 14 shows an example in which a guard time G1 is shorter than a propagation delay time Tp, the propagation delay time Tp is shorter than a symbol period L, and the sum of the propagation delay time Tp and a guard time G2 is greater than the symbol period L. That is, [(G1<Tp<L) & (Tp+G2>L), the symbol period=L]. In this case, an RN can receive a backhaul DL signal using symbols having symbol indices M=2 to 11. That is, the RN can use the 10 symbols for B-DL Rx.

FIGS. 15 to 21 show examples of a timing relationship between a B-UL Tx subframe over which an RN transmits a backhaul UL signal to an eNB and an A-UL Rx subframe over which an RN receives an access UL signal from an Re UE, on the basis of the macro subframe of the eNB. Here, the propagation delay time is taken into account.

Figure 15:
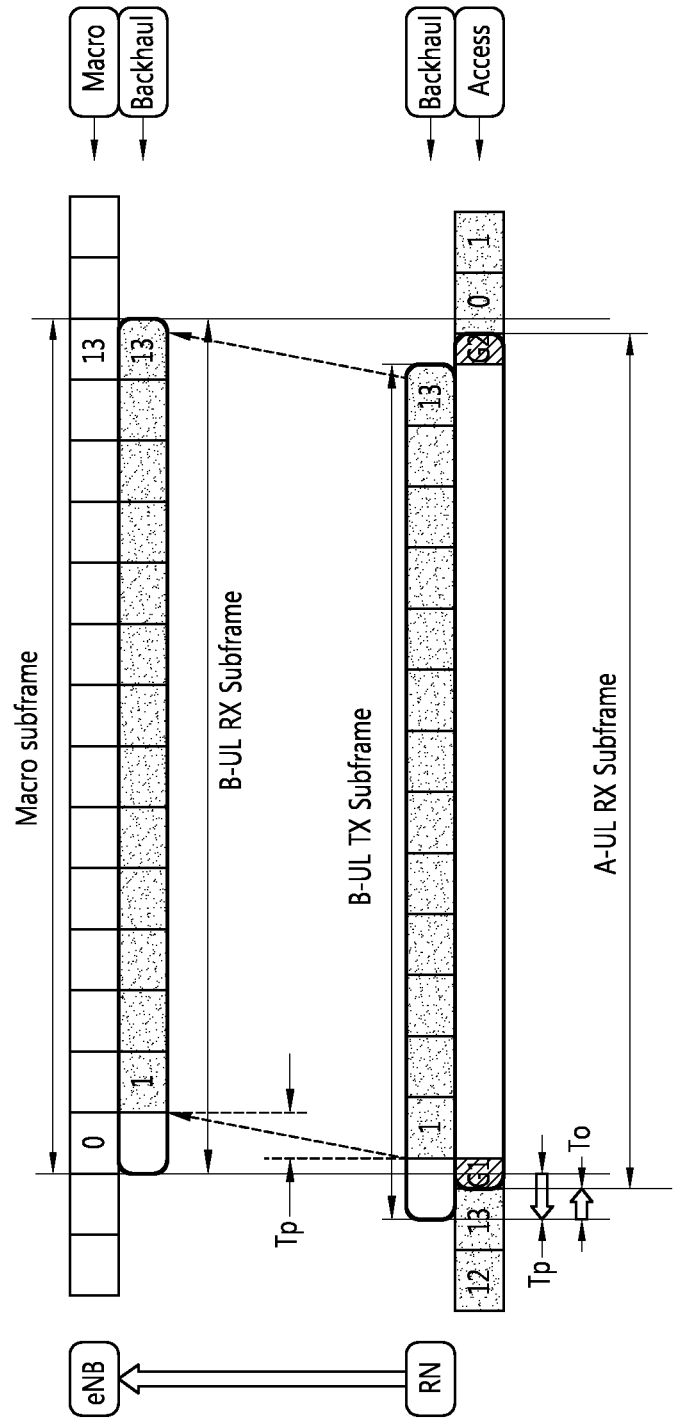
FIGS. 15 to 21 show examples of a timing relationship between a B-UL Tx subframe over which an RS transmits a backhaul UL signal to a BS and an A-UL Rx subframe over which an RS receives an access UL signal from an Re UE, on the basis of the macro subframe of the BS.

In FIG. 15, the B-UL Tx subframe and the A-UL Rx subframe have a time difference of a fixed offset value. FIG. 15 shows the example in which the offset time To has a negative value. The RN can puncture a symbol having an SC-FDMA symbol index of 0 and transmit the backhaul UL signal using 13 symbols having an SC-FDMA symbol index 1 to an SC-FDMA symbol index 13 (in case of a normal CP). That is, the offset time is placed between the B-UL Tx subframe over which the RN transmits the backhaul UL signal and the A-UL Rx subframe over which the RN receives the access UL signal from the Re UE, so that the RN can use the 13 symbols to transmit the backhaul UL signal.

Figure 16:
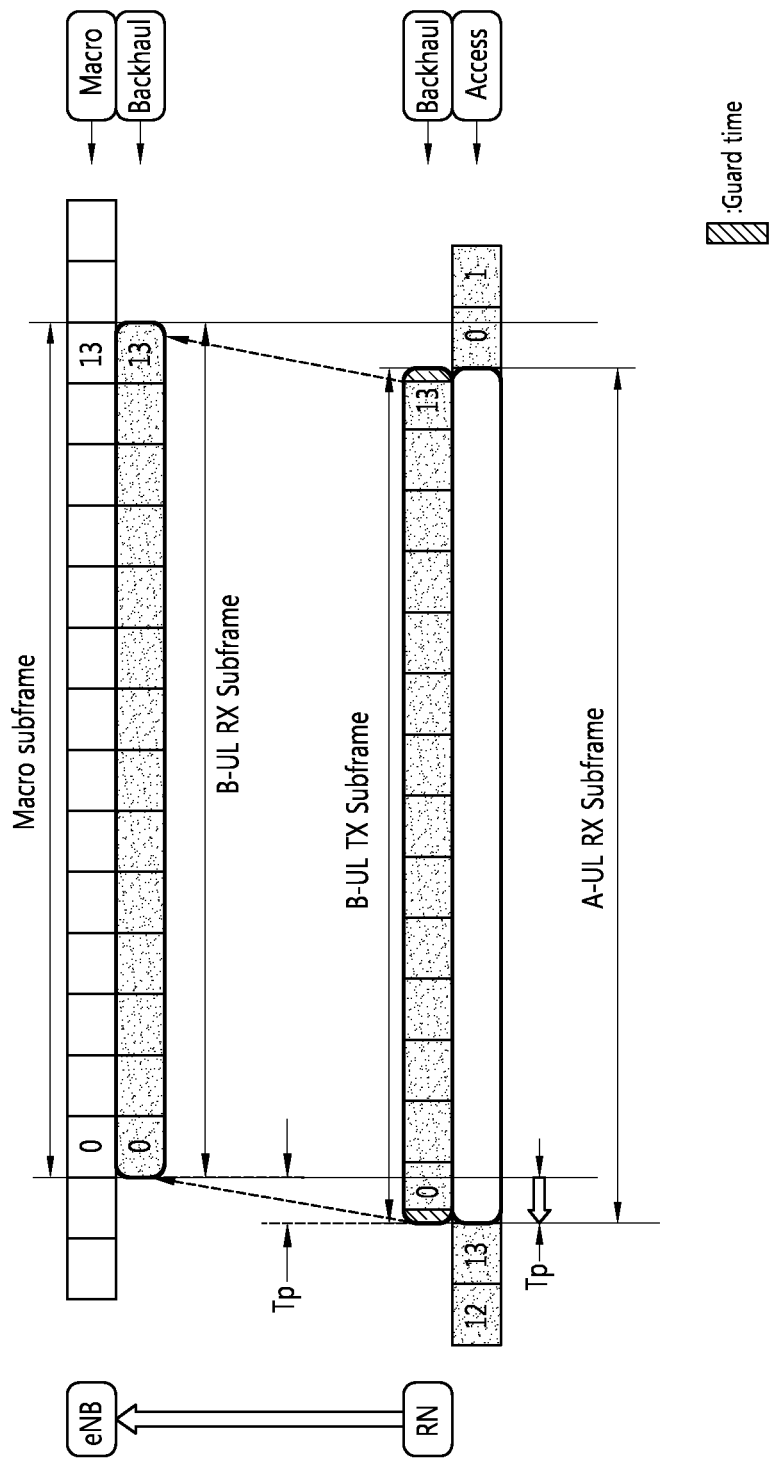

In FIG. 16, there is no time difference between the B-UL Tx subframe and the A-UL Rx subframe of an RN. That is, an offset value does not exist. This timing relationship corresponds to a case where the B-UL Tx subframe and the A-UL Rx subframe of the RN are aligned and the switching time of the RN is very short (e.g., a case where the switching time is shorter than a cyclic prefix). When the switching time of the RN is very short, there is no problem although the guard time is very short. Accordingly, the guard time necessary to switch the backhaul UL Tx and the access UL Rx of the RN rarely has an influence on the subframe structure. The RN can transmit the backhaul UL signal using 14 symbols having SC-FDMA symbol indices 0 to 13.

Figure 17:
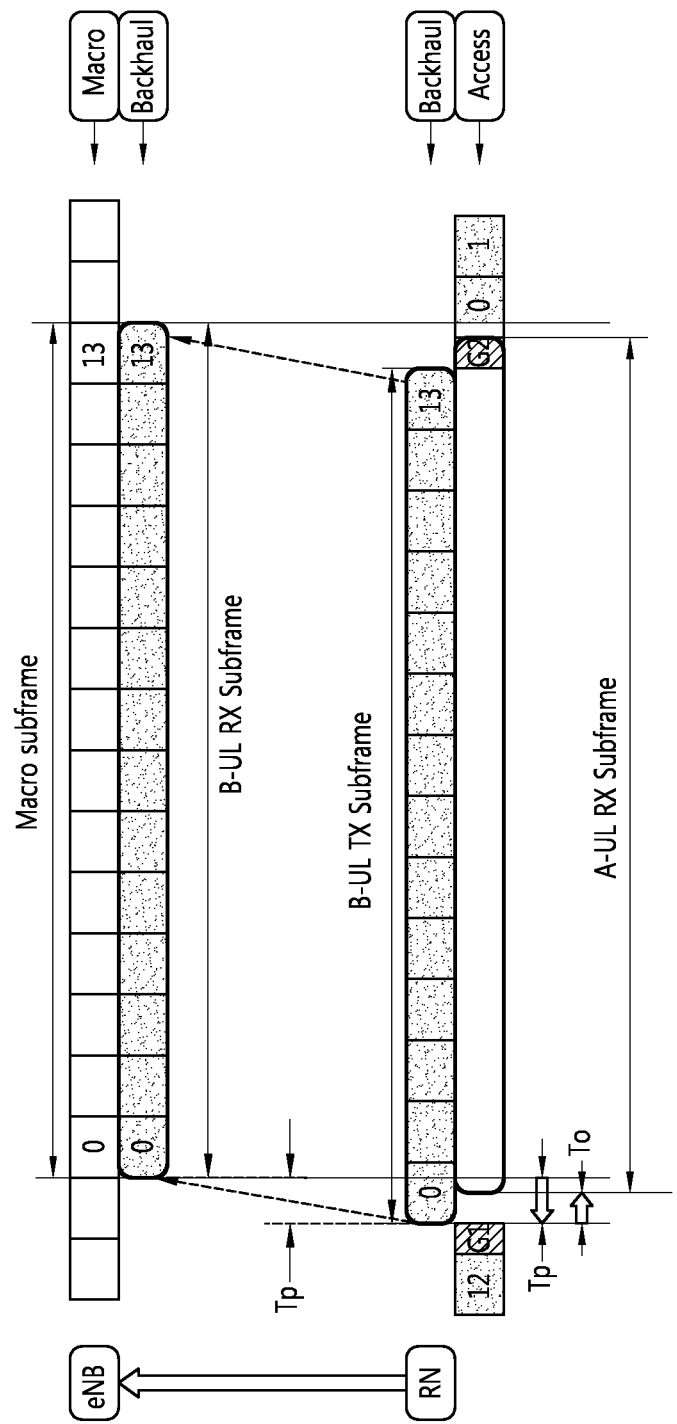

In FIG. 17, a time difference having a fixed offset value is placed between the B-UL Tx subframe and the A-UL Rx subframe of an RN. FIG. 17 shows an example in which the offset time has a negative value. FIG. 17 differs from FIG. 16 in that a guard time necessary between the A-UL Rx subframe and the B-UL Tx subframe of the RN is placed in the A-UL Rx subframe. Accordingly, the RN can transmit a backhaul UL signal using all 14 symbols having SC-FDMA symbol indices 0 to 13 (in case of a normal CP). Meanwhile, since the guard time is placed at the last symbol of the A-UL Rx subframe, the Re UE may be difficult to transmit an SRS over the last symbol. This is because the RN is difficult to receive the SRS.

Figure 18:
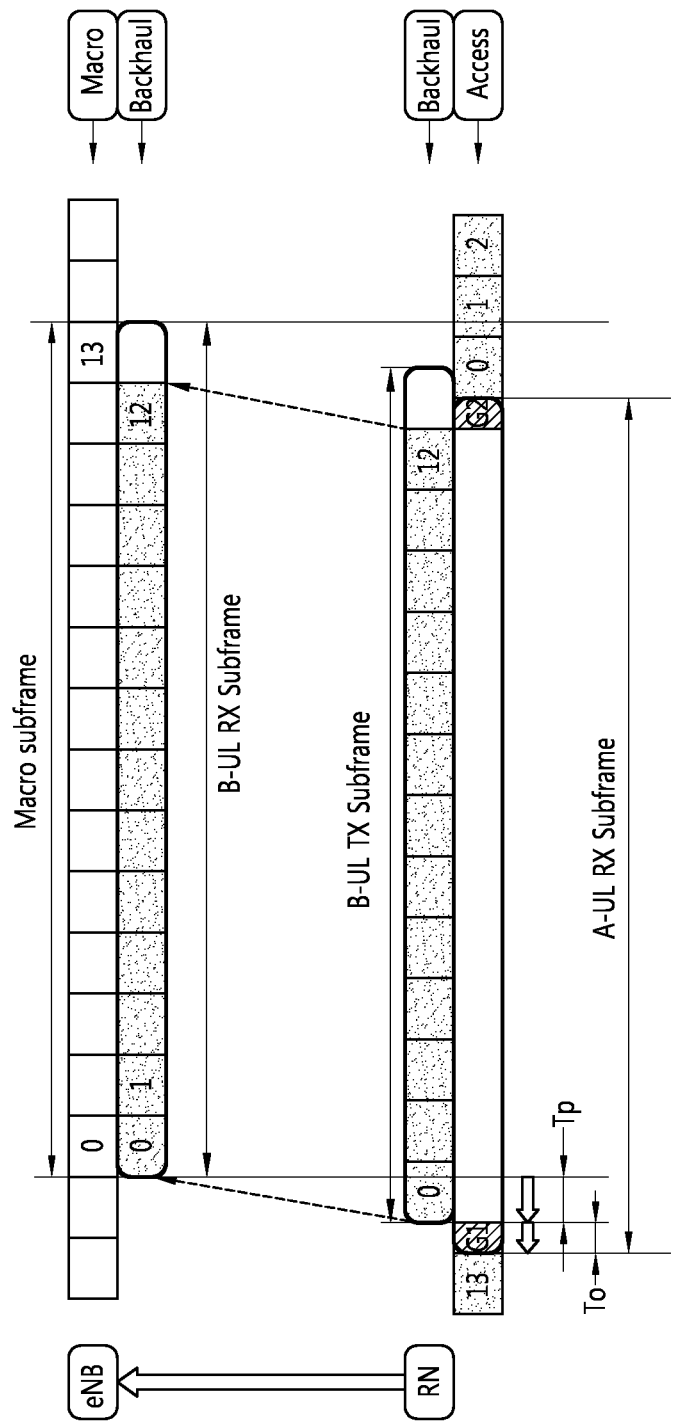

In FIG. 18, a time difference of a fixed offset value is placed between the B-UL Tx subframe and the A-UL Rx subframe of an RN. FIG. 18 is different from FIG. 17 in that the offset time has a positive value. That is, the A-UL Rx subframe is temporally ahead of the B-UL Tx subframe by the offset time. In this timing relationship, the RN can transmit a backhaul UL signal using 13 symbols having SC-FDMA symbol indices 0 to 12 (in case of a normal CP). The last symbol (i.e., a symbol having a symbol index 13) of the B-UL Tx subframe cannot be used owing to a guard time.

Figure 19:
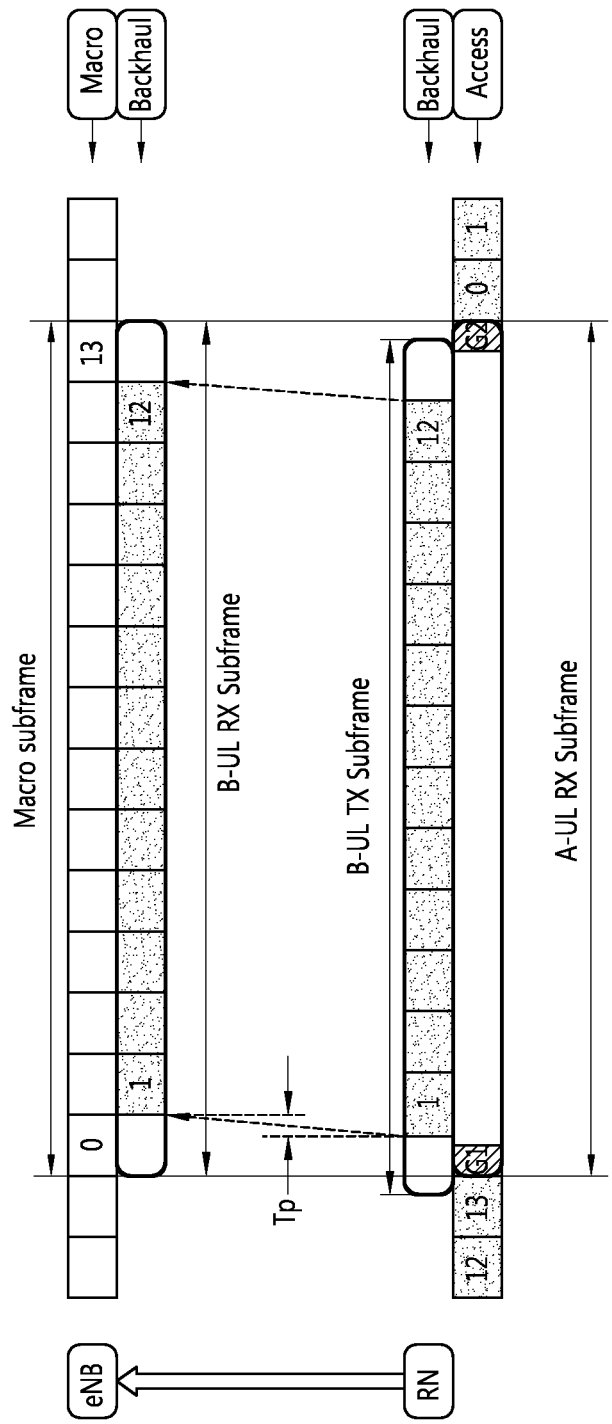

In FIG. 19, the A-UL Rx subframe of an RN and the B-UL Rx subframe of an eNB are aligned, and a B-UL Tx subframe is placed by taking a propagation delay time into account. This timing relationship may be applied to a case where the sum of a propagation delay time Tp and a guard time G1 is smaller than one symbol period L, the propagation delay time Tp is smaller than the guard time G1, and the sum of the propagation delay time Tp and the symbol period L is greater than a guard time G2. That is, the timing relationship may be applied to [(Tp+G1<L) & (Tp<G1) & (Tp+L>G2), the symbol period=L].

The RN can transmit a backhaul UL signal during a period from a symbol having a symbol index N of 1 or higher to a symbol having a symbol index N of 12 over the B-UL Tx subframe (in case of a normal CP). That is, the RN can transmit the backhaul UL signal over the 12 symbols.

Figure 20:
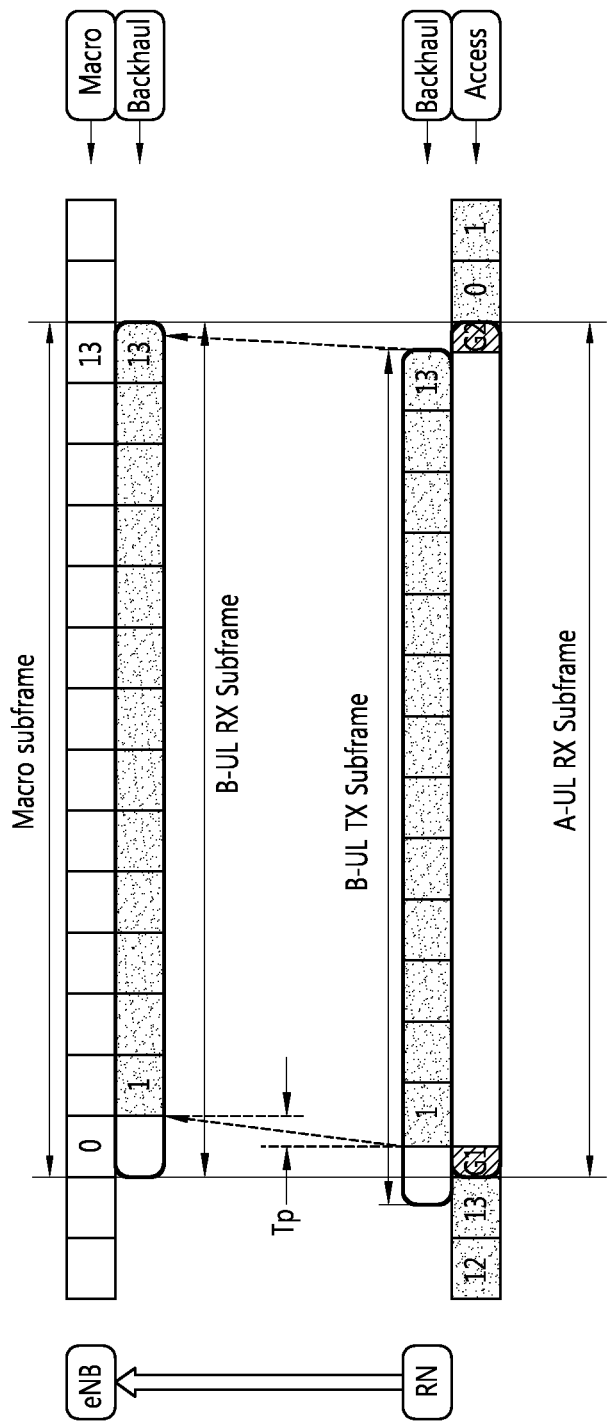

Like in FIG. 19, in FIG. 20, the A-UL Rx subframe of an RN and the B-UL Rx subframe of an eNB are aligned, and a B-UL Tx subframe is placed by taking a propagation delay time into account. FIG. 20 differs from FIG. 19 in an application condition. The timing relationship, such as that shown in FIG. 20, may be applied to a case where the sum of a propagation delay time Tp and a guard time G1 is smaller than one symbol period L, a guard time G2 is smaller than the propagation delay time Tp, and the propagation delay time Tp is smaller than the symbol period L. That is, the timing relationship may be applied to [(Tp+G1)<L & (G2<Tp<L), the symbol period=L]. The RN can transmit a backhaul UL signal using a period from a symbol having a symbol index N of 1 to a symbol having a symbol index N of 13 (in case of a normal CP). That is, the RN can transmit the backhaul UL signal using the 13 symbols.

Figure 21:
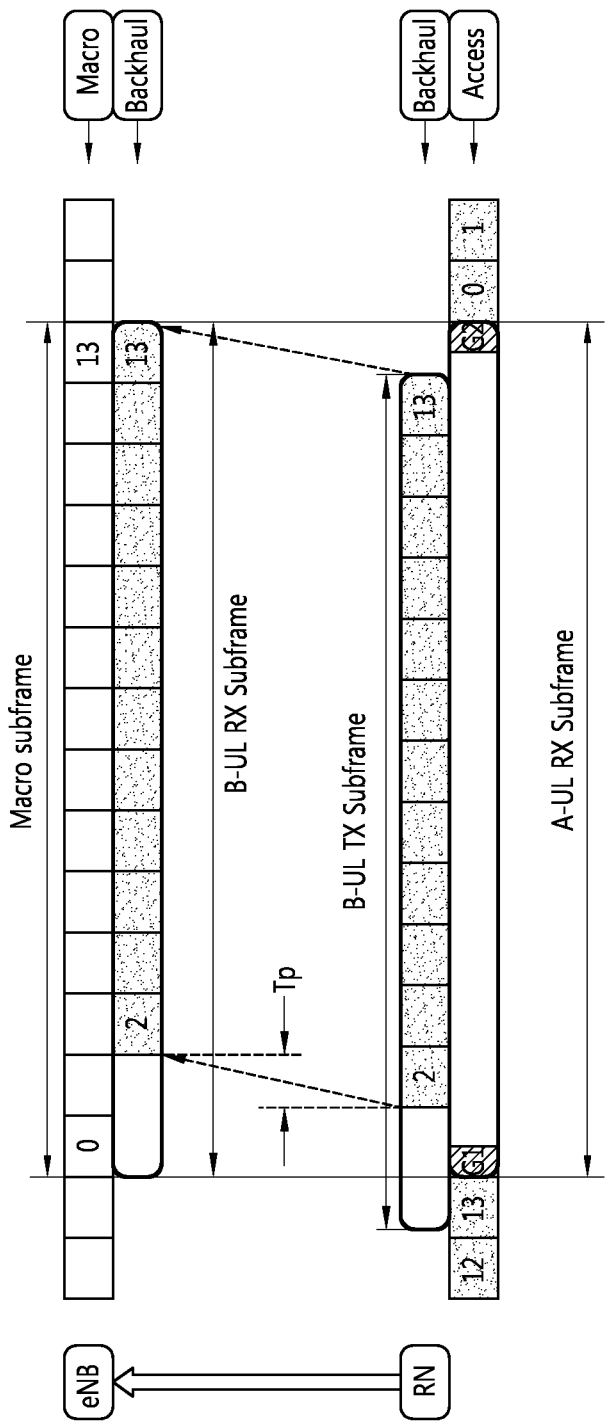

Like in FIG. 20, in FIG. 21, the A-UL Rx subframe of an RN and the B-UL Rx subframe of an eNB are aligned, and a B-UL Tx subframe is placed by taking a propagation delay time into account. The application condition in which the timing relationship of FIG. 21 is applied is a case where the sum of a propagation delay time Tp and a guard time G1 is greater than one symbol period L, a guard time G2 is smaller than the propagation delay time Tp, and the propagation delay time Tp is smaller than the symbol period L. That is, [(Tp+

G1>L) & (G2<Tp<L), the symbol period=L]. The RN can transmit a backhaul UL signal using 12 symbols having symbol indices N of 2 to 13 (in case of a normal CP).

How each of an eNB, an RN, and an Re UE is operated according to what timing relationship is described below in a wireless communication system including the eNB, the RN, and the Re UE.

Figure 22:
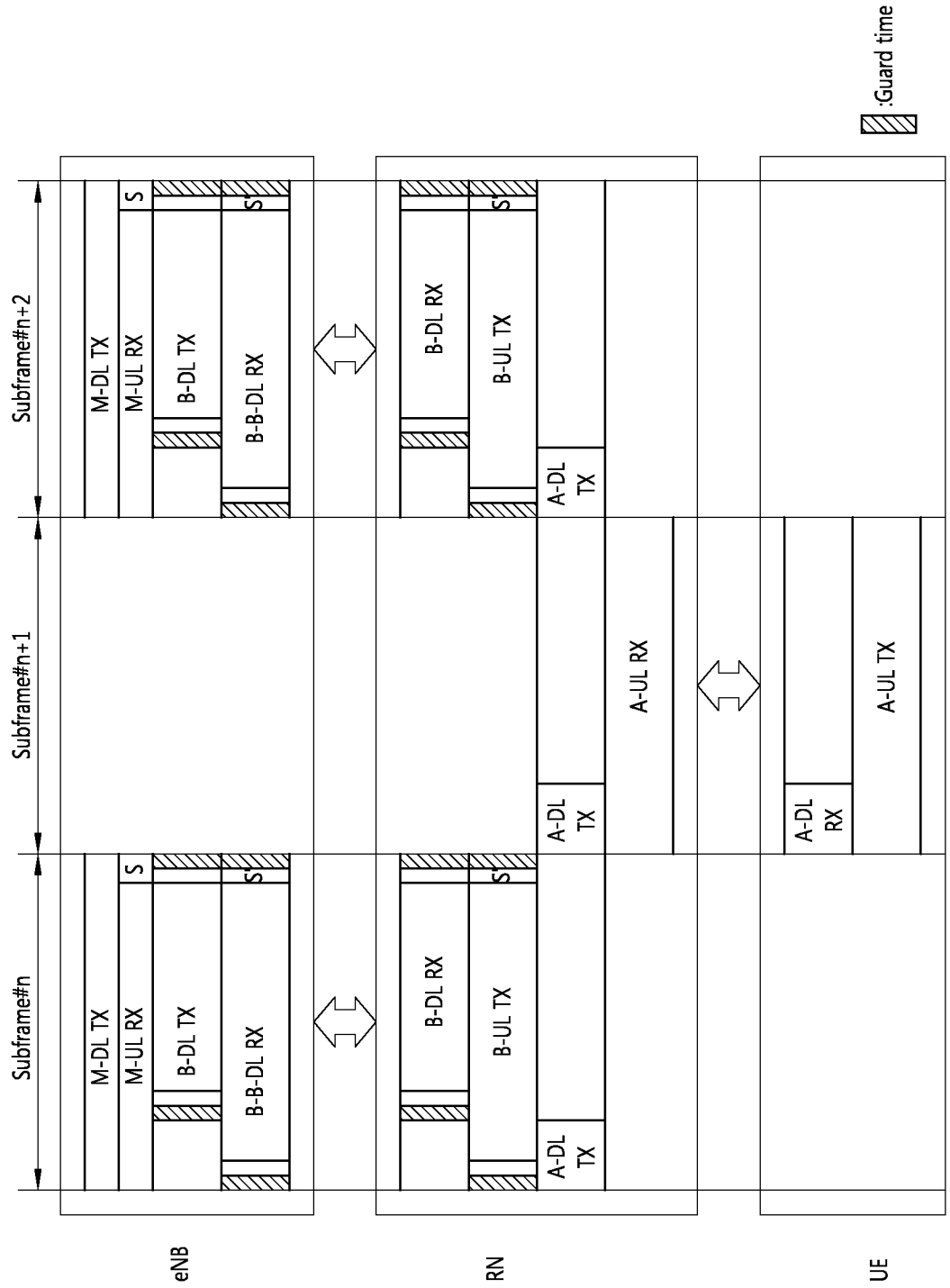
FIG. 22 shows an example of a timing relationship in a wireless communication system including a BS, an RS, and an Re UE.

FIG. 22 shows an example of a timing relationship in a wireless communication system including an eNB, an RN, and an Re UE. A propagation delay time is not shown in FIG. 22.

Referring to FIG. 22, the starting positions of subframe are synchronized between the eNB and the RN or between the eNB and the UE. In a subframe #(n+1), the RN receives (A-UL Rx) an access UL signal transmitted by the UE and transmits (B-UL Tx) a backhaul UL signal over a subframe #(n+2). The RN cannot transmit the backhaul UL signal because a guard time is placed within the subframe, as shown in FIG. 22, when the RN transmits (B-UL Tx) the backhaul UL signal over the subframe #(n+2) or a subframe #n. The RN transmits the backhaul UL signal using a shortened format (i.e., the first symbol and the last symbol from among 14 symbols included in the subframe are punctured and only 12 symbols are used). If the backhaul UL signal is transmitted using the shortened format, in order to transmit a backhaul SRS (indicated by S'), the RN has to transmit the SRS of a special form. That is, the RN generates the SRS of a special form, defined for a period smaller than one symbol, and transmits the backhaul SRS over the last symbol of the subframe.

Figure 23:
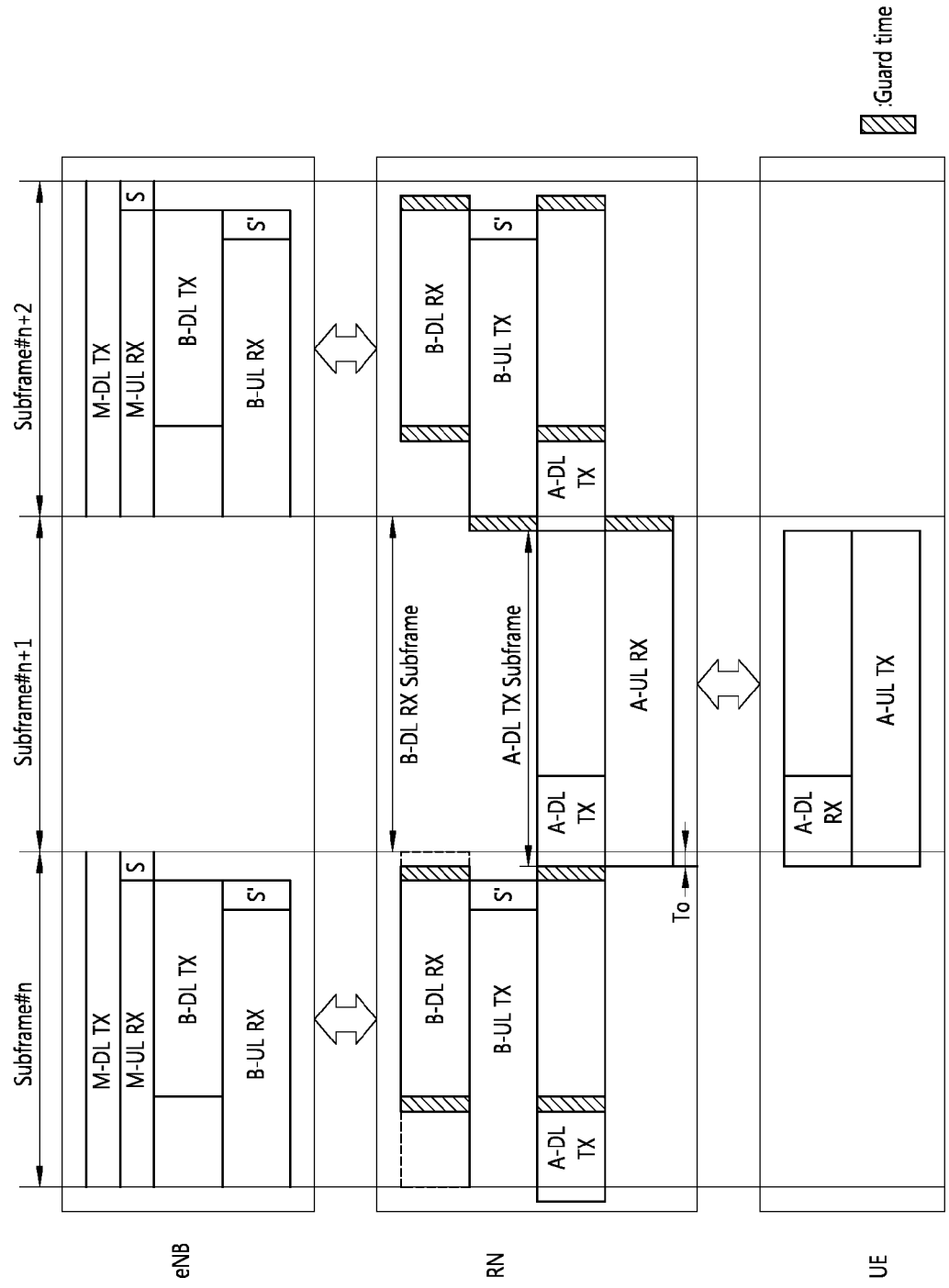
FIG. 23 shows another example of a timing relationship in a wireless communication system including a BS, an RS, and an Re UE.

FIG. 23 shows another example of a timing relationship in a wireless communication system including an eNB, an RN, and an Re UE. A propagation delay time is not shown in FIG. 23.

Referring to FIG. 23, an offset having a fixed time exists in the timing relationship between the subframes of the eNB and the RN and in the timing relationship between the subframes of the RN and the UE. In a subframe #(n+1), the A-DL Tx subframe and the A-UL Rx subframe of the RN, and the A-DL Rx subframe and the A-UL Tx subframe of the UE are forwardly shifted by an offset time To on the basis of an M-DL Tx subframe and an M-UL Rx subframe which are macro subframes. As described above, the offset time To is a value given by the eNB and may be determined according to the structure of a subframe used in the backhaul link.

When the wireless communication system is operated according to the timing relationship, the RN can transmit a backhaul UL signal using 13 symbols (in case of a normal CP). That is, the method described above with reference to FIG. 18 may be applied to the timing relationship.

Furthermore, the RN can receive a backhaul DL signal using 10 or 11 symbols (in case of a normal CP). That is, any one of the methods described above with reference to FIGS. 12 to 14 may be applied to the timing relationship.

Figure 24:
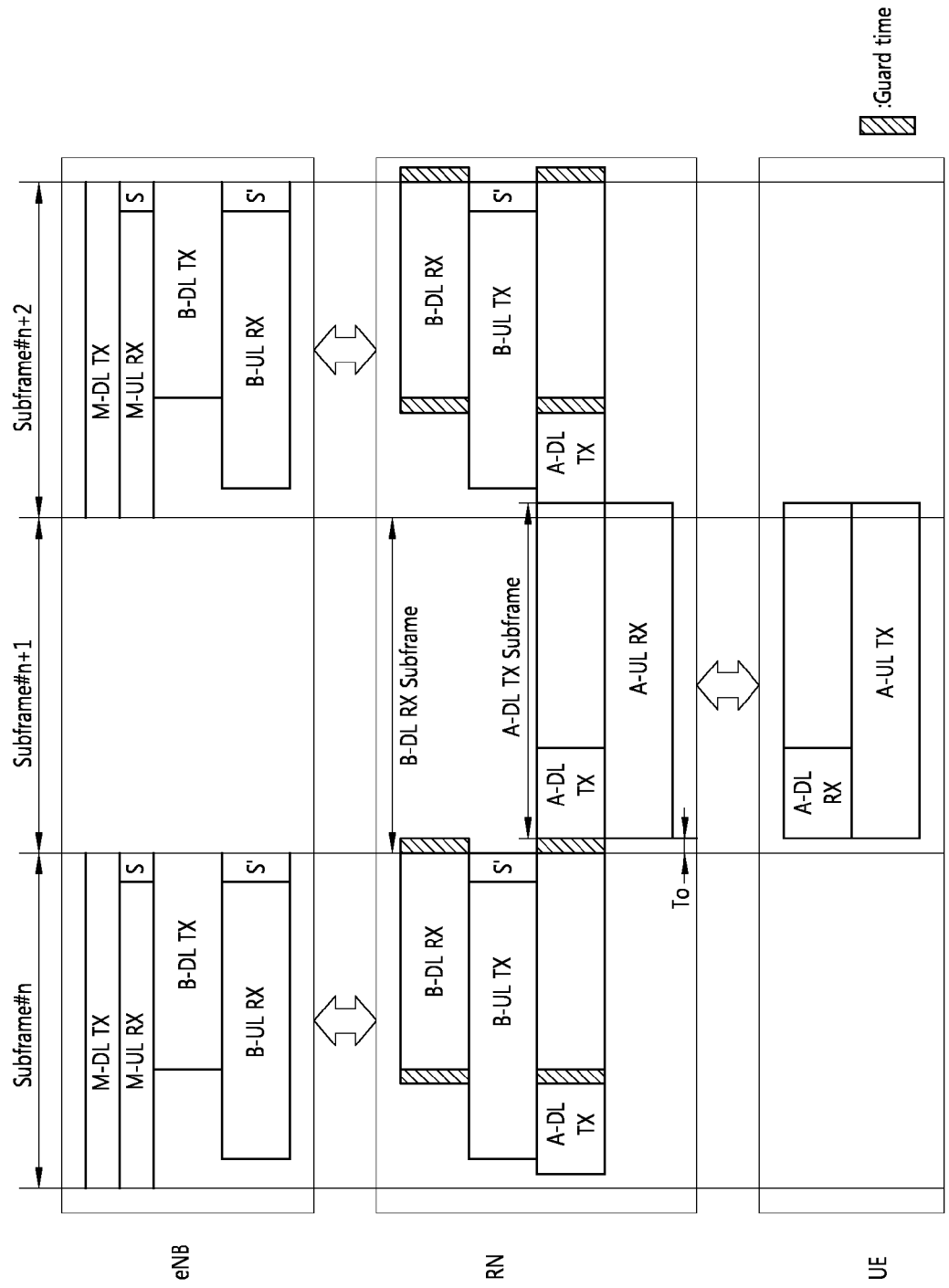
FIG. 24 shows yet another example of a timing relationship in a wireless communication system including a BS, an RS, and an Re UE.

FIG. 24 shows yet another example of a timing relationship in a wireless communication system including an eNB, an RN, and an UE. A propagation delay time is not shown in FIG. 24.

Referring to FIG. 24, an offset having a fixed time exists in the timing relationship between the subframes of the eNB and the RN and the timing relationship between the subframes of the RN and the UE. In a subframe #(n+1), the A-DL Tx subframe and the A-UL Rx subframe of the RN and the A-DL Rx subframe and the A-UL Tx subframe of the UE are backwardly shifted by an offset time To on the basis of an M-DL Tx subframe and an M-UL Rx subframe which are macro subframes. This is different from FIG. 23. As described above, the offset time To is a value given by the eNB and may be determined according to the structure of a subframe used in the backhaul link.

When the wireless communication system is operated according to this timing relationship, the RN can transmit a backhaul UL signal using 13 symbols (in case of a normal CP). The method described above with reference to FIG. 15 may be applied to the timing relationship. FIG. 24 is different from FIG. 23 in that the RN can use the last symbol of the B-UL Tx subframe over which the backhaul UL signal is transmitted and the B-UL Tx subframe is synchronized with a macro subframe for each symbol. Accordingly, there is an advantage in that a backhaul SRS (indicated by S') can be multiplexed with an SRS transmitted by an Ma UE and then transmitted. Alternatively, the RN may transmit the backhaul UL signal using all 14 symbols (in case of a normal CP). That is, the method described with reference to FIG. 17 may be applied to the timing relationship. If the method described with reference to FIG. 17 is applied, the RN does not receive an access UL signal over the last symbol of the A-UL Rx subframe, but places a guard time G1 in the last symbol of the A-UL Rx.

Furthermore, if the number of symbols used in an R-PDCCH transmitted to the UE is K, the RN can receive a backhaul DL signal using symbols having a symbol index K+1 to the last index. That is, the method described above with reference to FIG. 10 may be applied to this timing relationship.

Figure 25:
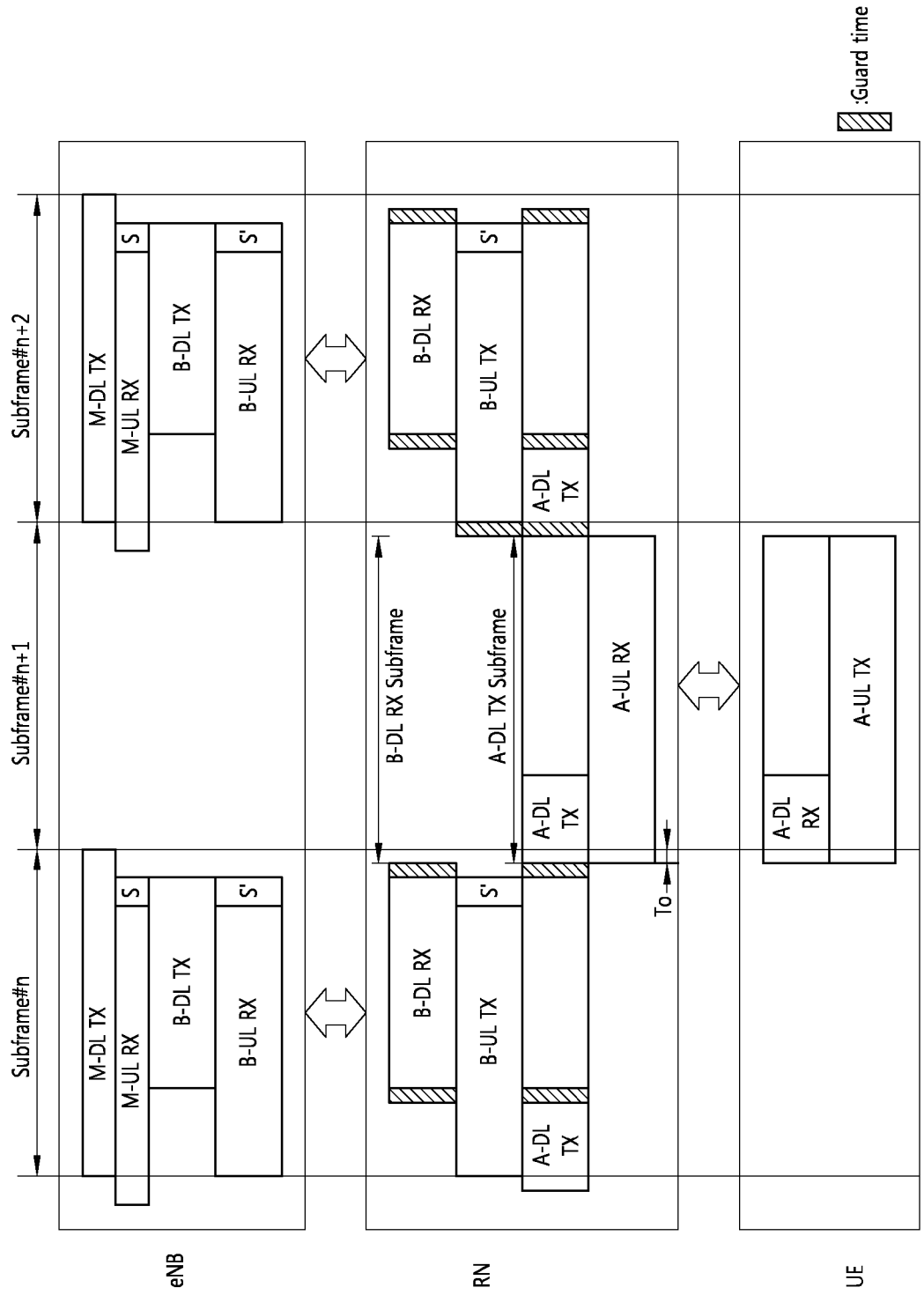
FIG. 25 shows further yet another example of a timing relationship in a wireless communication system including a BS, an RS, and an Re UE.

FIG. 25 shows further yet another example of a timing relationship in a wireless communication system including an eNB, an RN, and an UE. A propagation delay time is not shown in FIG. 25.

Referring to FIG. 25, the macro subframes (i.e., an M-DL Tx subframe and an M-UL Rx subframe) of the eNB are misaligned. The access subframes (i.e., an A-DL Tx subframe and an A-UL Rx subframe) of the RN are aligned. The access subframe of the RN is shifted from the backhaul subframe of the RN by an offset time To. That is, the access subframe of the RN is temporally ahead of the backhaul subframe of the RN by the offset time To. Because of the offset time, the RN can transmit a backhaul UL signal using the 13 symbols of the B-UL Tx subframe (in case of a normal CP). Furthermore, if the RN transmits a backhaul SRS (indicated by S') over the B-UL Tx subframe, there is an advantage in that the symbol is synchronized with a symbol through which an Ma UE transmits an SRS by symbol unit.

Figure 26:
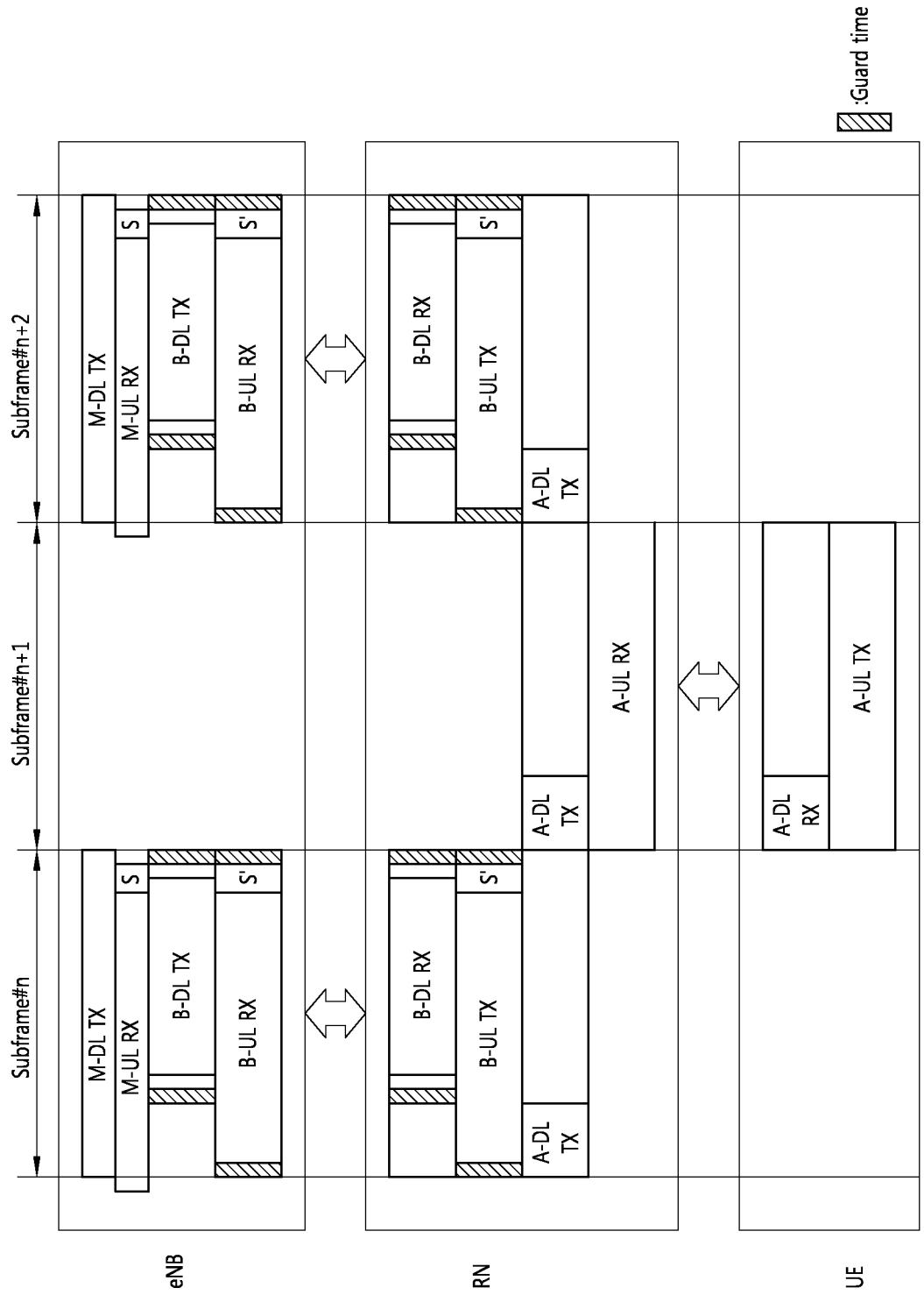
FIG. 26 and FIG. 27 show further yet another example of a timing relationship in a wireless communication system including a BS, an RS, and an Re UE.
Figure 27:
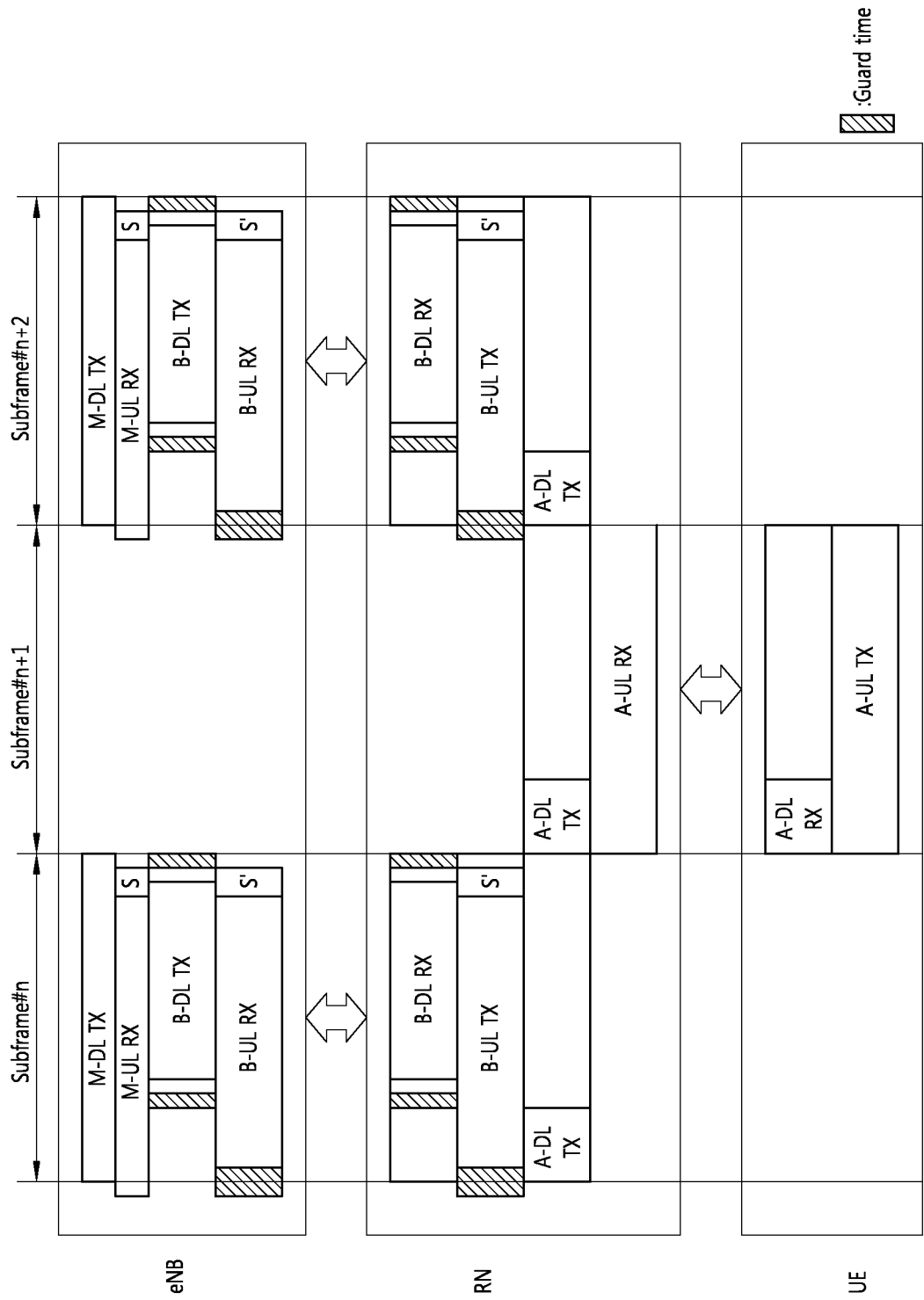

FIG. 26 and FIG. 27 show further yet another example of a timing relationship in a wireless communication system including an eNB, an RN, and an UE. A propagation delay time is not shown in FIGS. 26 and 27.

As shown in FIGS. 26 and 27, the eNB may forwardly shift an M-UL Rx subframe so that it is synchronized with a B-UL Rx subframe for each symbol unit. The B-DL Tx subframe of the eNB and the B-DL Rx subframe of the RN are synchronized with each other. Likewise, the B-UL Rx subframe of the eNB and the B-UL Tx subframe of the RN are synchronized with each other. In the RN, access subframes (i.e., an A-DL Tx subframe and an A-UL Rx subframe) are synchronized with each other.

An M-UL Rx subframe and the B-UL Rx subframe can be synchronized with each other for each symbol according to this timing relationship. Accordingly, there is an advantage in that the RN does not need to transmit a special SRS in which a backhaul SRS is placed in the time domain smaller than one symbol. If the synchronization is performed for each symbol, interference between an SRS transmitted by an Ma UE and the backhaul SRS transmitted by the RN is reduced. FIG. 27 is different from FIG. 26 in that a guard time is indicated in another period.

Figure 28:
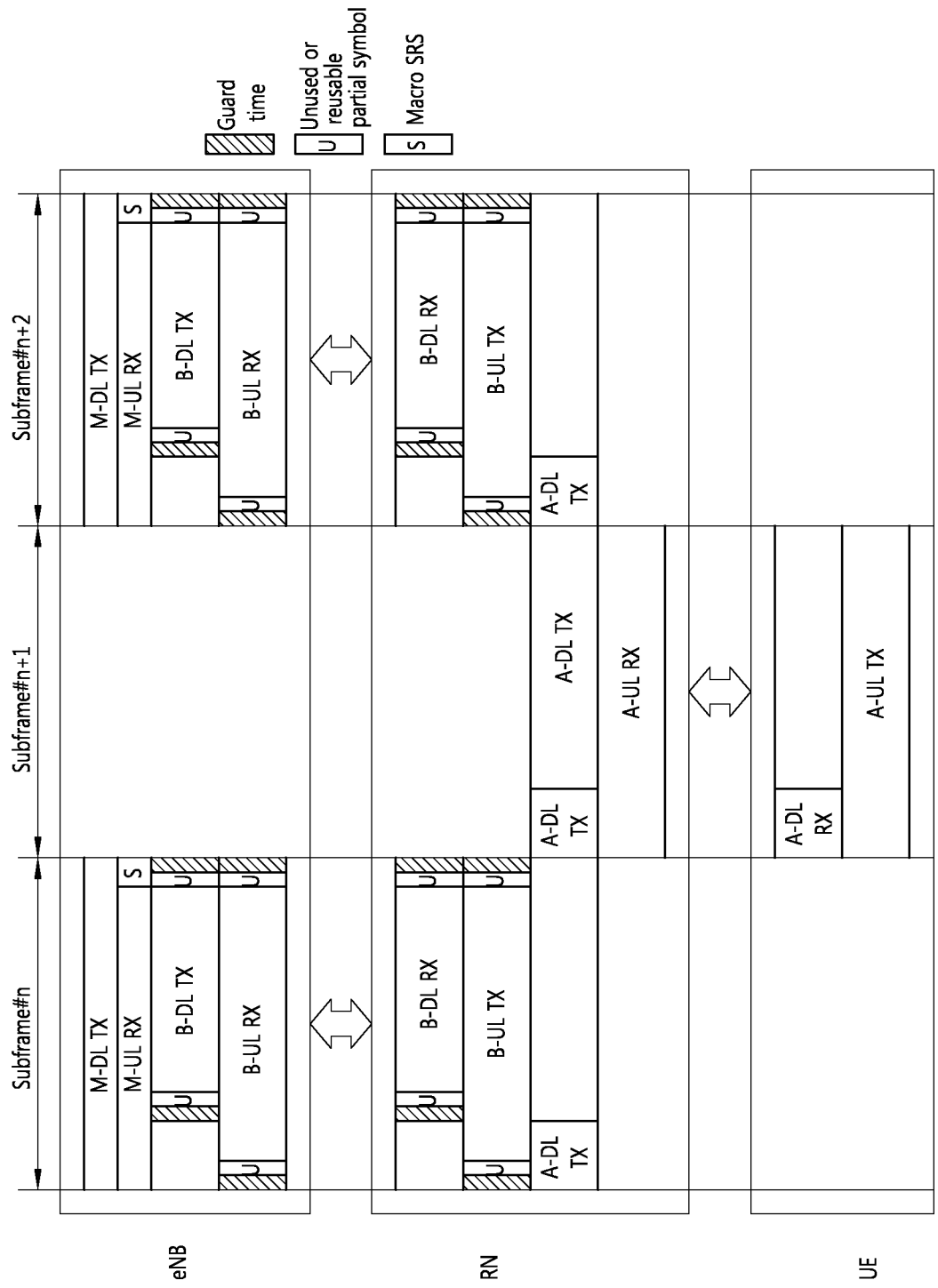
FIG. 28 shows further yet another example of a timing relationship in a wireless communication system including a BS, an RS, and an Re UE.

FIG. 28 shows further yet another example of a timing relationship in a wireless communication system including an eNB, an RN, and an UE. A propagation delay time is not shown in FIG. 28.

Referring to FIG. 28, all the macro subframe and the backhaul subframe of the eNB, the backhaul subframe and the access subframe of the RN, and the access subframes of the UE are aligned and synchronized with each other.

In this timing relationship, the eNB wastes 2 symbols owing to a guard time in a B-DL Tx subframe, and the RN also wastes 2 symbols owing to a guard time in a B-DL Rx subframe. The same is true of the B-UL Rx subframe of the eNB and the B-UL Tx subframe of the RN. In the symbols including the guard time, a part indicated by 'U' is the wasted region. If some of the symbols are referred to as partial symbols, the waste problem of the partial symbols can be solved by defining and using a new symbol as described above.

Figure 29:
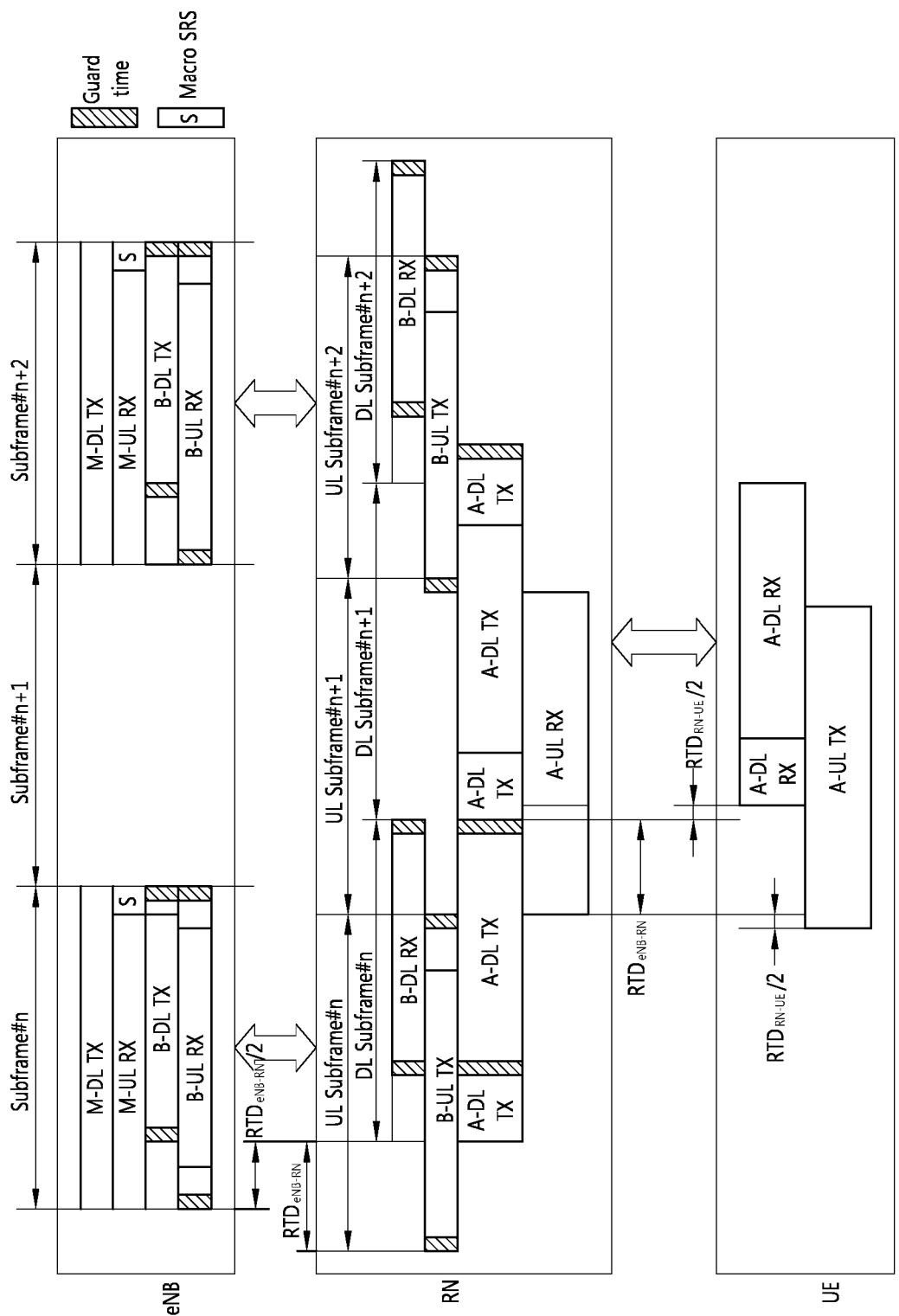
FIG. 29 shows further yet another example of a timing relationship in a wireless communication system including a BS, an RS, and an Re UE.

FIG. 29 shows further yet another example of a timing relationship in a wireless communication system including an eNB, an RN, and an UE. A propagation delay time is taken into account and shown in FIG. 29.

Hereinafter, a round trip delay time between the eNB and the RN is indicated by $RTD_{eNB-RS}$, and a round trip delay time between the RN and the UE is indicated by $RTD_{RS-UE}$. The propagation delay time may be ($RTD_{eNB-RS}/2$) between the eNB and the RN and may be ($RTD_{RS-UE}/2$) between the RN and the UE.

Referring to FIG. 29, the B-UL Rx subframe of the eNB is aligned with an M-UL Rx subframe. The B-UL Tx subframe of the RN may be placed ahead of the B-UL Rx subframe of the eNB by ($RTD_{eNB-RS}/2$) by taking the propagation delay time into account. Furthermore, the B-DL Rx subframe of the RN may be placed behind the B-DL Tx subframe of the eNB by ($RTD_{eNB-RS}/2$). In this case, the B-UL Tx subframe and the B-DL Rx subframe of the RN may be placed with a difference by $RTD_{eNB-RS}$. That is, the backhaul link subframes (i.e., the B-UL Tx subframe and the B-DL Rx subframe) of the RN are misaligned. In the RN, the B-DL Rx subframe and the A-DL Tx subframe are switched and used, and the B-UL Tx subframe and the A-UL Rx subframe are switched and used. The A-DL Tx subframe and the A-UL Rx subframe of the RN have also to be placed with a difference by $RTD_{eNB-RS}$ by taking the above into account.

When a relationship between the RN and the UE is taken into account, in case of A-UL, the UE has only to transmit an access UL signal ahead of ($RTD_{RS-UE}/2$) by taking the propagation delay time into consideration. That is, the A-UL Tx subframe of the UE has only to be placed ahead of the A-UL Rx subframe of the RN by ($RTD_{RS-UE}/2$). In case of access downlink (A-DL), the A-DL Tx subframe of the RN has only to be placed ahead of the A-DL Rx subframe of the UE by ($RTD_{RS-UE}/2$). However, since there is the difference of $RTD_{eNB-RS}$ between the A-DL Tx subframe and the A-UL Rx subframe of the RN, the A-UL Tx subframe and the A-DL Rx subframe of the UE should not be placed with the difference of $RTD_{RS-UE}$, but have to be placed with a difference of ($RTD_{eNB-RS}+RTD_{RS-UE}$).

According to this timing relationship, when a legacy UE (e.g., a UE operated according to 3GPP LTE release 8) attempts initial access owing to a reason, such as the entry of a cell), the legacy UE transmits a PRACH (physical random access channel) preamble like in a conventional method used in a relationship with an eNB because it does not know whether a destination station is the eNB or an RN. There may be a disadvantage in that the legacy UE has to transmit a preamble having a large coverage when the RN has a small cell size. However, there is an advantage in that radio resources useful for the RN to transmit a backhaul UL signal can be maximized.

Figure 30:
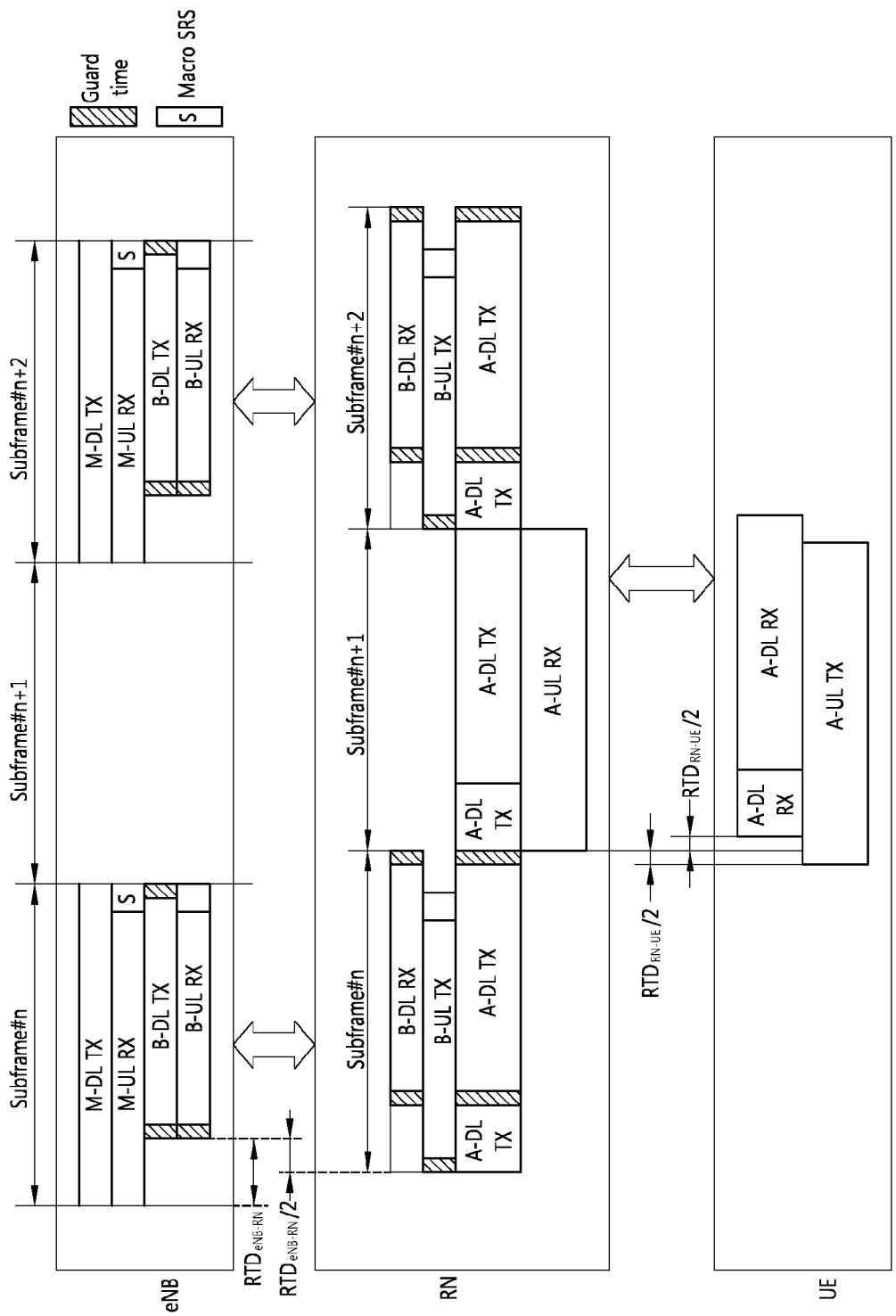
FIG. 30 shows further yet another example of a timing relationship in a wireless communication system including a BS, an RS, and an Re UE.

FIG. 30 shows further yet another example of a timing relationship in a wireless communication system including an eNB, an RN, and an UE. A propagation delay time is taken into account and shown in FIG. 30.

Referring to FIG. 30, downlink subframes (i.e., a B-DL Rx subframe and an A-DL Tx subframe) and uplink subframes (i.e., a B-UL Tx subframe and an A-UL Rx subframe) are aligned in the RN. The B-UL Tx subframe and the B-DL Rx subframe of the RN may be placed behind the B-UL Rx subframe and the B-DL Tx subframe of the eNB by ($RTD_{eNB-RS}/2$).

This timing relationship does not have an influence on a legacy UE (e.g., a UE operated according to 3GPP LTE release 8). Resources that may be used by the RN in backhaul UL transmission are reduced by $RTD_{eNB-RS}$ in the time domain, but there is an advantage in that the legacy UE can be operated by applying the same time difference between an A-DL Rx subframe and an A-UL Tx subframe. Furthermore, if $RTD_{eNB-RS}$ is greater than a guard time, the RN may multiplex a backhaul SRS with an SRS transmitted by an Ma UE and then transmit the multiplexed SRS.

Timing relationships in which an eNB, an RN, and a UE transmit and receive signals for each symbol of a subframe are described below. In the following figures, a part indicated by 'G' means a guard time, 'S' means an SRS transmitted from the UE to the eNB, and 'S'' means a backhaul SRS transmitted from the RN to the eNB. A propagation delay time is not shown.

Figure 31:
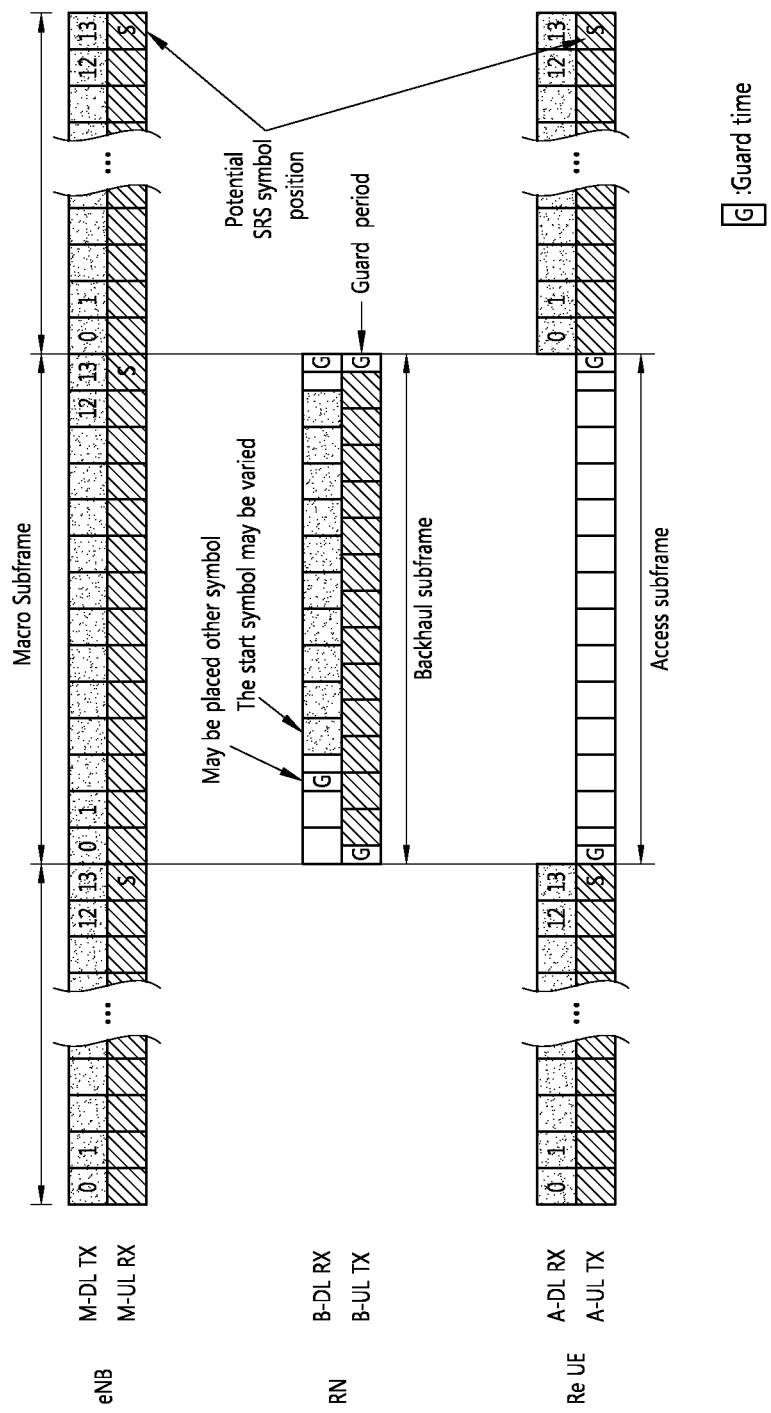
FIG. 31 shows further yet another example of a timing relationship in a wireless communication system including a BS, an RS, and an Re UE.

FIG. 31 shows further yet another example of a timing relationship in a wireless communication system including an eNB, an RN, and an Re UE.

Referring to FIG. 31, an M-UL Rx subframe, an M-DL Tx subframe, a B-DL Rx subframe, a B-UL Tx subframe, an A-DL Rx subframe, and A-UL Tx subframes are aligned on the basis of a subframe boundary. The B-DL Rx subframe and the B-UL Tx subframe are aligned on the basis of the subframe boundary, but include guard times. Accordingly, the B-DL Rx subframe and the B-UL Tx subframe are not aligned for each symbol. The guard time included in the B-DL Rx subframe may be included in a different symbol from that of FIG. 31, and the start point of a symbol at which a backhaul DL signal is received from the eNB over the B-UL Tx subframe may be different form that of FIG. 31.

Figure 32:
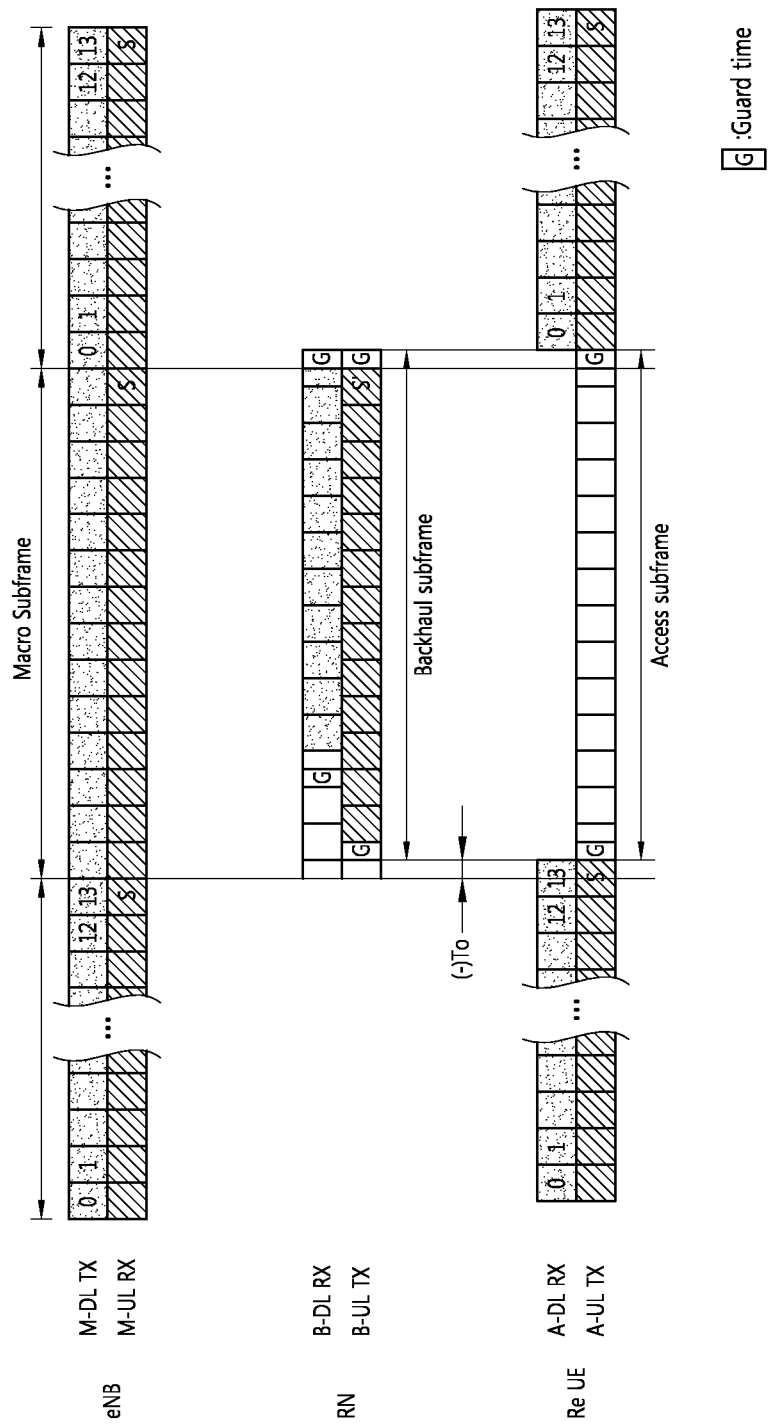
FIG. 32 shows further yet another example of a timing relationship in a wireless communication system including a BS, an RS, and an Re UE.

FIG. 32 shows further yet another example of a timing relationship in a wireless communication system including an eNB, an RN, and an Re UE.

Referring to FIG. 32, a B-DL Rx subframe, a B-UL Tx subframe, an A-DL Rx subframe, and an A-UL Tx subframes have different points of timing based on a subframe boundary in regard to an M-UL Rx subframe and an M-DL Tx subframe. That is, the B-DL Rx subframe and the B-UL Tx subframe of the RN and the A-DL Rx subframe and the A-UL Tx subframe of the Re UE have a negative offset time. The eNB can transmit information about the offset time so that the RN and the Re UE have a timing relationship. A symbol through which a backhaul SRS is transmitted, in the B-UL Tx subframe, is aligned with a symbol through which a macro SRS is received over the M-UL Rx subframe by symbol unit.

Figure 33:
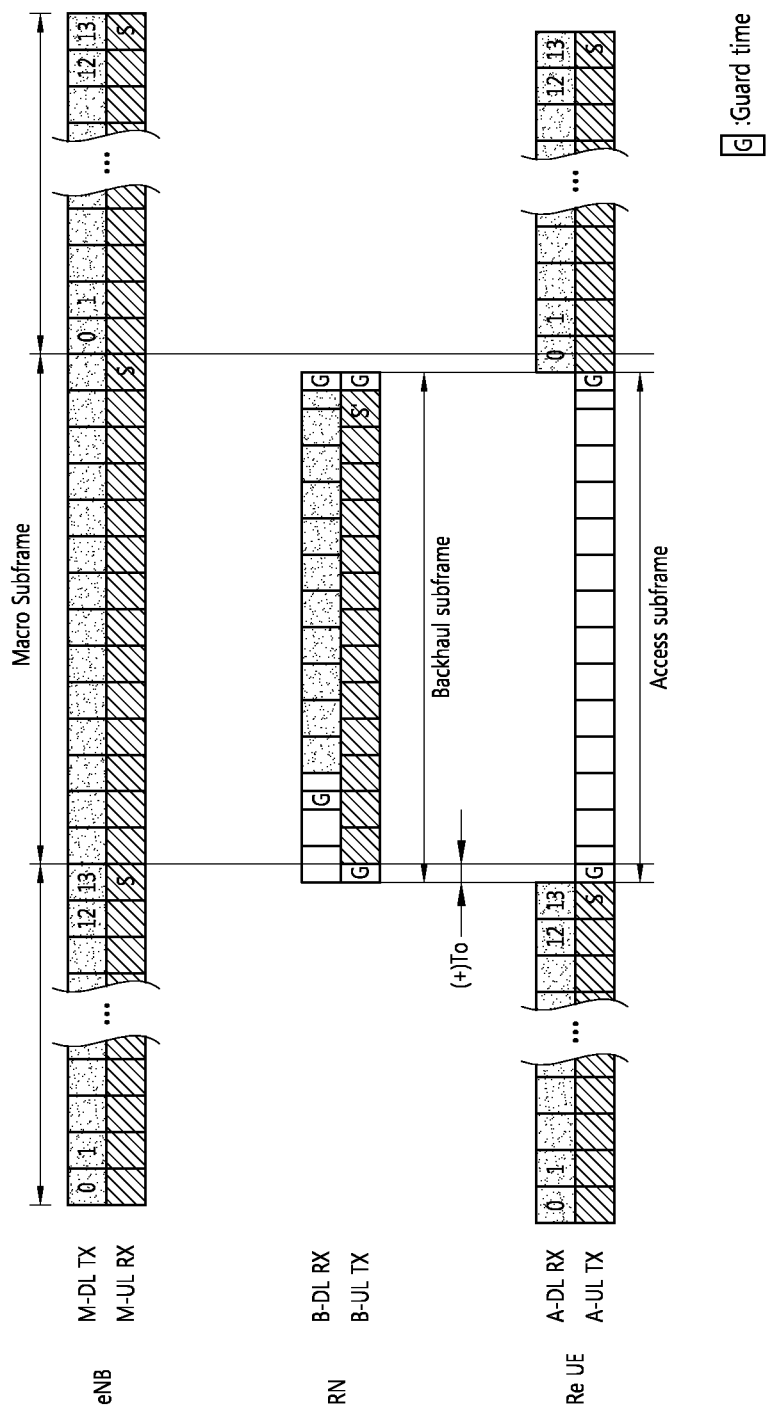
FIG. 33 shows further yet another example of a timing relationship in a wireless communication system including a BS, an RS, and an Re UE.

FIG. 33 shows further yet another example of a timing relationship in a wireless communication system including an eNB, an RN, and an Re UE.

Unlike in FIG. 32, in FIG. 33, the B-DL Rx subframe and the B-UL Tx subframe of the RN and the A-DL Rx subframe and the A-UL Tx subframe of the Re UE have a positive timing offset in regard to an M-UL Rx subframe and an M-DL Tx subframe. A backhaul SRS transmitted over the B-UL Tx subframe may be transmitted over a different symbol (the thirteenth symbol of the B-UL Tx subframe) from a macro SRS (i.e., a macro SRS received over the M-UL Rx subframe) transmitted by an Ma UE. Accordingly, the macro SRS and the backhaul SRS need not to be multiplexed in the last symbol (a fourteenth symbol) of the subframe.

Figure 34:
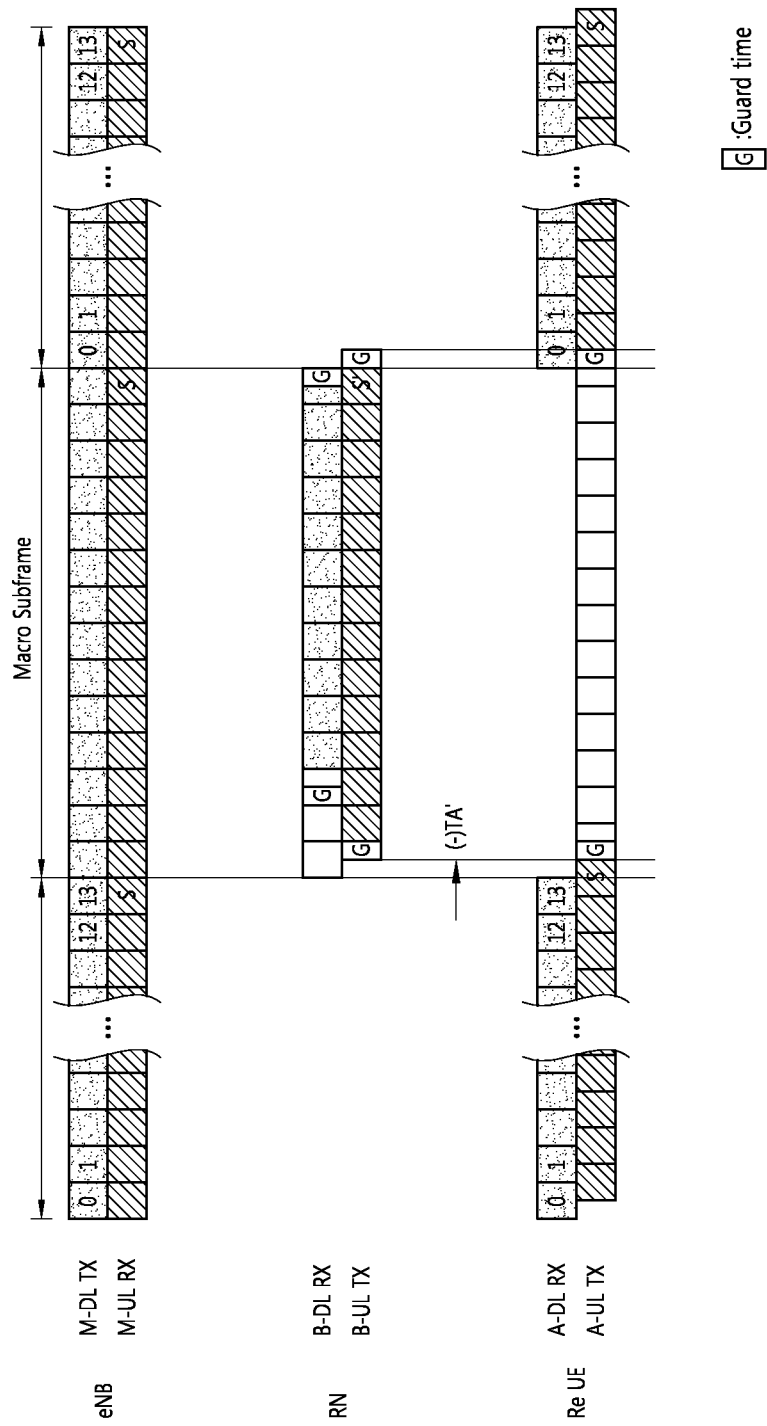
FIG. 34 shows further yet another example of a timing relationship in a wireless communication system including a BS, an RS, and an Re UE.

FIG. 34 shows further yet another example of a timing relationship in a wireless communication system including an eNB, an RN, and an Re UE.

Referring to FIG. 34, an M-DL Tx subframe, a B-DL Rx subframe, and an A-DL Rx subframe are aligned on the basis of a subframe boundary. That is, in a macro subframe, a backhaul subframe, and an access subframe, downlink subframes are aligned on the basis of the subframe boundary. On the other hand, in regard of an M-UL Rx subframe, a B-UL Tx subframe and an A-UL Tx subframe are misaligned on the basis of the subframe boundary. The eNB can apply this timing relationship by transmitting an additional timing adjustment command (indicated by TA') to the RN or the UE. Here, the additional timing adjustment command may be a signal which is additionally transmitted in addition to the existing timing adjustment command in order to compensate for a propagation delay time or a round trip time.

This timing relationship cannot be applied to the existing legacy UE because it does not understand the additional timing adjustment command, but can be applied to a UE which can understand the additional timing adjustment command TA'. FIG. 34 shows an example in which the additional timing adjustment command TA' having a negative value is performed. That is, FIG. 34 shows an example in which the B-UL Tx subframe and the A-UL Tx subframe are temporally shifted backwardly. In this timing relationship, a backhaul SRS and a macro SRS transmitted over the B-UL Tx subframe can be aligned for each symbol.

Figure 35:
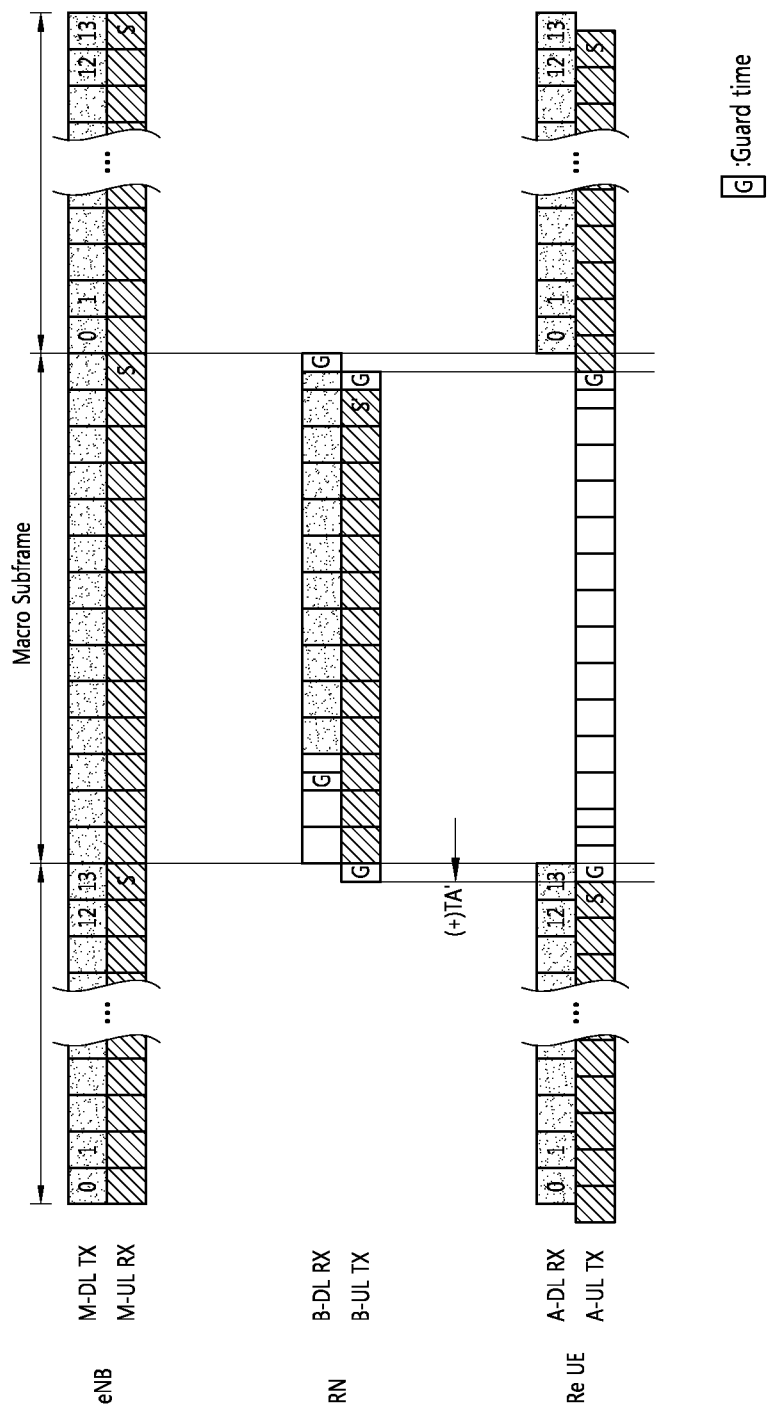
FIG. 35 shows further yet another example of a timing relationship in a wireless communication system including a BS, an RS, and an Re UE.

FIG. 35 shows further yet another example of a timing relationship in a wireless communication system including an eNB, an RN, and an Re UE.

Like in FIG. 34, in FIG. 35, an M-DL Tx subframe, a B-DL Rx subframe, and an A-DL Rx subframe are aligned on the basis of a subframe boundary. On the other hand, an M-UL Rx subframe, a B-UL Tx subframe, and an A-UL Tx subframe are misaligned on the basis of the subframe boundary. FIG. 35 is different from FIG. 34 in that an additional timing adjustment command is set to a positive value. That is, FIG. 35 shows an example in which the B-UL Tx subframe and the A-UL Tx subframe are temporally shifted forwardly.

Figure 36:
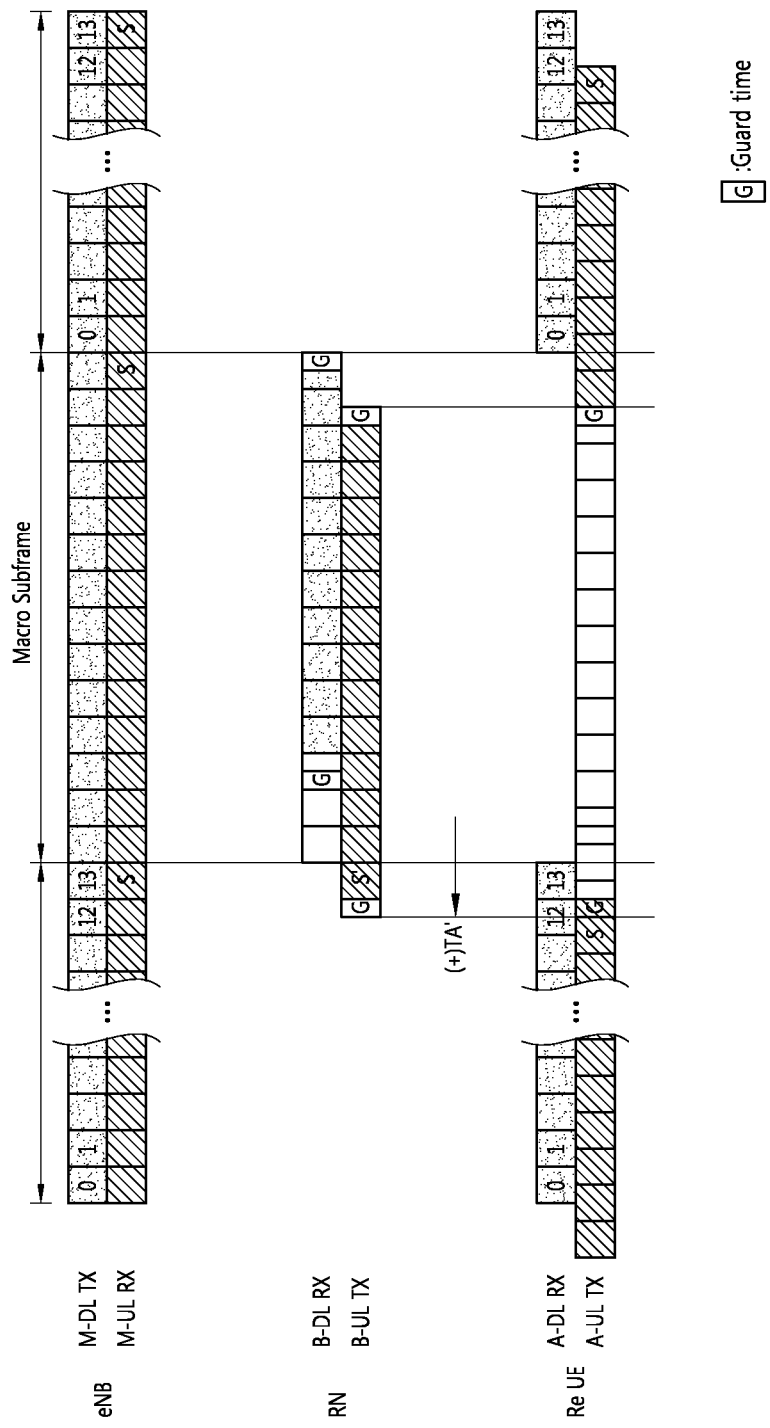
FIG. 36 shows further yet another example of a timing relationship in a wireless communication system including a BS, an RS, and an Re UE.

FIG. 36 shows further yet another example of a timing relationship in a wireless communication system including an eNB, an RN, and an Re UE.

An M-DL Tx subframe, a B-DL Rx subframe, and an A-DL Rx subframe are aligned on the basis of a subframe boundary. An additional timing adjustment command having a positive value is applied to an M-UL Rx subframe, a B-UL Tx subframe, and an A-UL Tx subframe. FIG. 36 differs from FIG. 35 in that the degree that the B-UL Tx subframe and the A-UL Tx subframe are shifted is one symbol or more. For example, the B-UL Tx subframe and the A-UL Tx subframe may be forwardly shifted by (one symbol+a guard time). The B-UL Tx subframe and the A-UL Tx subframe do not temporally overlap with each other because they are forwardly shifted.

If the B-UL Tx subframe is forwardly shifted by one symbol or more, a backhaul SRS can be transmitted over the first symbol other than a guard time. In this case, the backhaul SRS can be aligned with the macro SRS of the M-UL Rx subframe by symbol unit, as shown in FIG. 36. Since the macro SRS and the backhaul SRS can be multiplexed and transmitted, a collision with a PUSCH and a PUCCH received through the M-UL Rx subframe can be avoided.

In order to increase the number of symbols which can transmit backhaul uplink data over the B-UL Tx subframe through which the backhaul SRS is transmitted, the eNB may allow an Ma UE to always transmit data in a shortened format. For example, irrespective of whether a macro SRS has been transmitted, the Ma UE can always transmit data in the shortened format. Alternatively, the eNB may inform the RN of a subframe through which the Ma UE does not transmit the macro SRS and may configure the subframe as a subframe using the shortened format. In this case, the RN may take the amount of possible backhaul resources into account when determining whether the backhaul SRS is transmitted, the format of an R-PUSCH and the like. The utilization of resources can be increased by sharing information about macro SRS transmission timing and backhaul SRS transmission timing between the eNB and the RN.

Figure 37:
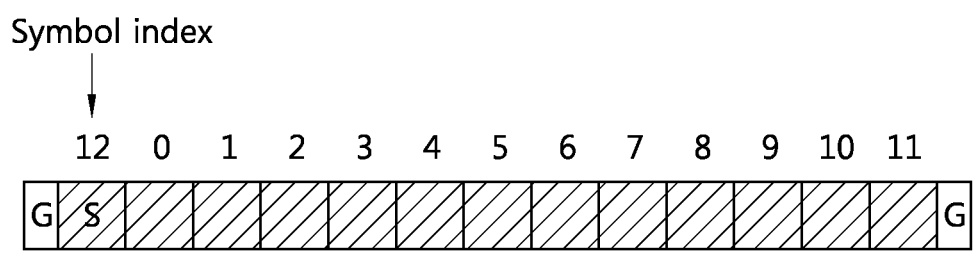
FIGS. 37 and 38 illustrate the symbol indices of B-UL Tx subframes over which a backhaul SRS is transmitted.
Figure 38:
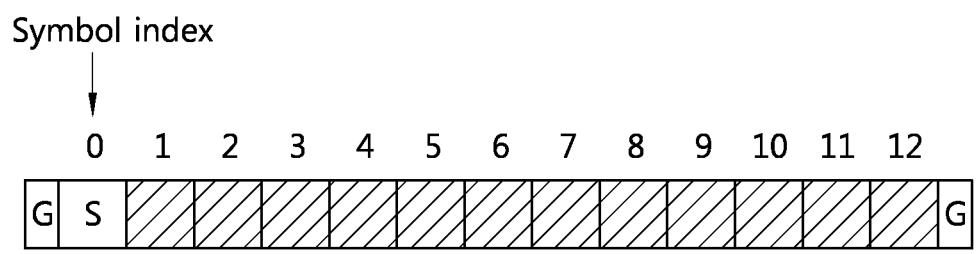

FIGS. 37 and 38 illustrate the symbol indices of B-UL Tx subframes over which a backhaul SRS is transmitted.

As shown in FIGS. 37 and 38, the backhaul SRS can be transmitted over the first symbol of a B-UL Tx subframe other than guard times. In this case, the symbol indices of the B-UL Tx subframe may be assigned for each symbol (e.g., for an OFDM symbol or SC-FDMA symbol) in time periods other than the guard times. In FIG. 37, the index of the first symbol through which the backhaul SRS is transmitted is assigned 12, and indices from 0 to 11 are sequentially assigned to subsequent symbols. According to the method of assigning symbol indices, it may be said that the backhaul SRS is always transmitted through the symbol 12 despite the position of physical resources. In FIG. 38, the index of a first symbol through which a backhaul SRS is transmitted assigned 0, and indices from 1 to 12 are sequentially assigned to subsequent symbols. If a backhaul SRS is transmitted, 13 symbols may be used in the B-UL Tx subframe. If a backhaul SRS is not transmitted, 12 symbols may be used in the B-UL Tx subframe.

Figure 39:
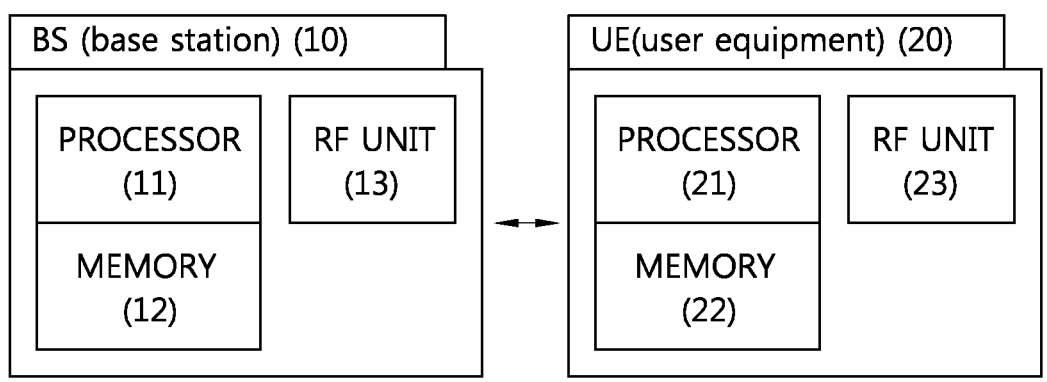
FIG. 39 is a block diagram showing a source station and a destination station.

FIG. 39 is a block diagram showing a source station and a destination station.

The source station 10 may be an eNB. The source station 10 includes a processor 11, memory 12, and a Radio Frequency (RF) unit 13. The processor 11 implements the proposed functions, processes, and/or methods. That is, the processor 11 can transmit a synchronization signal to the destination station and can transmit information for an offset time and an additional timing adjustment command TA'. The layers of a radio interface protocol may be implemented by the processor 11. The memory 12 is coupled to the processor 11 and configured to store various pieces of information for driving the processor 11. The RF unit 13 is coupled to the processor 11 and configured to transmit and/or receive a radio signal.

The destination station 20 may be a UE (i.e., an RN, an Ma UE, or an Re UE). The destination station 20 includes a processor 21, memory 22, and an RF unit 23. The processor 21 receives a synchronization signal, information for an offset time, and an additional timing adjustment command and determines the timing of a subframe over which a signal is transmitted or received. The layers of a radio interface protocol may be implemented by the processor 21. The memory 22 is coupled to the processor 21 and configured to store various pieces of information for driving the processor 21. The RF unit 23 is coupled to the processor 21 and configured to transmit and/or receive a radio signal.

The processor 11, 21 can include an Application-Specific Integrated Circuit (ASIC), other chipset, a logic circuit, a data processor and/or a converter for converting a baseband signal and a radio signal, and vice versa. The memory 12, 22 may include Read-Only Memory (ROM), Random Access Memory (RAM), flash memory, a memory card, a storage medium and/or other storage devices. The RF unit 13, 23 includes one or more antennas for transmitting and/or receiving a radio signal. When the embodiments are implemented in software, the above schemes may be implemented using a module (process, function or the like) which performs the above functions. The module can be stored in the memory 12, 22 and executed by the processor 11, 21. The memory 12, 22 may be placed inside or outside the processor 11, 21 and connected to the processor 11, 21 through a variety of well-known means.

Although the some embodiments of the present invention have been described above, a person having ordinary skill in the art will appreciate that the present invention may be modified and changed in various ways without departing from the technical spirit and scope of the present invention. Accordingly, the present invention is not limited to the embodiments and the present invention may be said to include all embodiments within the scope of the claims below.

The invention claimed is:

1. A method of transmitting and receiving a signal for a relay station in a wireless communication system, the method comprising:
   transmitting a control signal to a relay user equipment through an access downlink transmission subframe; and
   receiving a backhaul downlink signal, transmitted from a base station through a backhaul downlink transmission subframe, through a backhaul downlink reception subframe;
   wherein orthogonal frequency division multiplexing (OFDM) symbols, used for transmission of the backhaul downlink signal, are determined by whether the access downlink transmission subframe and the backhaul downlink transmission subframe are transmitted with time aligned subframe boundaries.

2. The method of claim 1, wherein both the access downlink transmission subframe and the backhaul downlink transmission subframe are comprised of a first slot and a second slot in time domain.

3. The method of claim 2, wherein both the first slot and the second slot are comprised of 7 OFDM symbols in normal cyclic prefix and are comprised of 6 OFDM symbols in extended cyclic prefix.

4. The method of claim 3, if the access downlink transmission subframe and the backhaul downlink transmission subframe are transmitted with time aligned subframe boundaries by the base station and the relay station,
   from a first OFDM symbol to sixth OFDM symbol of a second slot of the backhaul downlink transmission subframe are used for a transmission of the backhaul downlink signal.

5. The method of claim 3, if the access downlink transmission subframe and the backhaul downlink transmission subframe are transmitted without time aligned subframe boundaries by the base station and the relay station,
   from a first OFDM symbol to seventh OFDM symbol of a second slot of the backhaul downlink transmission subframe are used for a transmission of the backhaul downlink signal.

6. The method of claim 1, wherein if the control signal is transmitted to the relay user equipment through the access downlink transmission subframe using first K symbols, the backhaul downlink signal is transmitted in a time period from a symbol, having a symbol index of K+1 in the backhaul downlink transmission subframe, to a last symbol of the backhaul downlink transmission subframe. Here, the symbol index starts from 0.

7. The method of claim 6, wherein the K is 1 or 2.

8. The method of claim 1, the method further comprising:
   receiving offset time information from a base station; and
   configuring a time difference between the access downlink transmission subframe and the backhaul downlink reception subframe based on the offset time information.

9. The method of claim 1, wherein if a switching time between the access downlink transmission subframe and the backhaul downlink reception subframe is shorter than a cyclic prefix, the backhaul downlink signal is received in a time period from a symbol, having a symbol index of K in the backhaul downlink reception subframe, to a last symbol of the backhaul downlink reception subframe.

10. The method of claim 1, wherein if the access downlink transmission subframe is synchronized with a macro downlink transmission subframe through which the base station transmits a macro downlink signal to a macro user equipment, the backhaul downlink signal is received starting from a symbol having a symbol index of K or higher in the backhaul downlink reception subframe.

11. The method of claim 10, wherein in case of a normal cyclic prefix, the backhaul downlink signal is received in 10 or 11 symbol periods in the backhaul downlink reception subframe.

12. An apparatus for transmitting and receiving a signal in a wireless communication system, the apparatus comprising:
   a radio frequency unit configured to transmit and receive a radio signal; and
   a processor coupled to the radio frequency unit,
   wherein the processor transmits a control signal to a relay user equipment through an access downlink transmission subframe and receives a backhaul downlink signal, transmitted from a base station through a backhaul downlink transmission subframe, through a backhaul downlink reception subframe,
   wherein orthogonal frequency division multiplexing (OFDM) symbols, used for transmission of the backhaul downlink signal, are determined by whether the access downlink transmission subframe and the backhaul downlink transmission subframe are transmitted with time aligned subframe boundaries.

* * * * *